US010208426B2

(12) United States Patent
Sealey et al.

(10) Patent No.: US 10,208,426 B2
(45) Date of Patent: Feb. 19, 2019

(54) BELT OR FABRIC INCLUDING POLYMERIC LAYER FOR PAPERMAKING MACHINE

(71) Applicant: STRUCTURED I, LLC, Great Neck, NY (US)

(72) Inventors: James E. Sealey, Belton, SC (US); Bryd Tyler Miller, IV, Easley, SC (US); Phillip MacDonald, Anderson, SC (US); Taras Z. Andrukh, Greenville, SC (US); Justin C. Pence, Anderson, SC (US)

(73) Assignee: Structured I, LLC, Great Neck, NY (US)

( * ) Notice: Subject to any disclaimer, the term of this patent is extended or adjusted under 35 U.S.C. 154(b) by 0 days.

(21) Appl. No.: 15/431,497

(22) Filed: Feb. 13, 2017

(65) Prior Publication Data
US 2017/0233946 A1  Aug. 17, 2017

Related U.S. Application Data

(60) Provisional application No. 62/294,158, filed on Feb. 11, 2016.

(51) Int. Cl.
*B32B 3/26* (2006.01)
*D21F 7/08* (2006.01)
(Continued)

(52) U.S. Cl.
CPC .............. *D21F 7/083* (2013.01); *B32B 3/266* (2013.01); *B32B 5/024* (2013.01); *B32B 5/028* (2013.01);
(Continued)

(58) Field of Classification Search
CPC ...... D21F 7/083; D21F 1/0036; D21F 3/0227; D21F 1/0027; D21F 1/80; B32B 5/028;
(Continued)

(56) References Cited

U.S. PATENT DOCUMENTS 2,919,467 A    1/1960  Mercer
2,926,154 A    2/1960  Keim
(Continued)

FOREIGN PATENT DOCUMENTS

CA    2168894 A1    8/1997
CA    2795139 A1    10/2011
(Continued)

OTHER PUBLICATIONS

International Preliminary Report on Patentability of PCT/US2013/053593 dated Feb. 3, 2015.
(Continued)

*Primary Examiner* — Jose A Fortuna
(74) *Attorney, Agent, or Firm* — Amster, Rothstein & Ebenstein LLP

(57) ABSTRACT

A fabric or belt for a papermaking machine including a first layer that defines a web contacting surface and a second layer that supports the first layer. The first layer is made of extruded polymer and includes a plurality of first elements aligned in a first direction, a plurality of second elements aligned in a second direction and extending over the plurality of first elements, and a plurality of open portions defined by the plurality of first and second elements. The second layer is made of woven fabric. The first layer is bonded to the second layer so that the first layer extends only partially through the second layer and an interface formed between the first and second layers includes bonded and unbonded portions and airflow channels that extend in a plane parallel to the first and second layers.

62 Claims, 12 Drawing Sheets

(51) Int. Cl.
*B32B 5/02* (2006.01)
*B32B 5/10* (2006.01)
*B32B 5/12* (2006.01)
*B32B 5/26* (2006.01)
*D21F 1/00* (2006.01)
*D21H 27/00* (2006.01)
*B32B 7/04* (2006.01)
*B32B 7/08* (2006.01)
*B32B 7/12* (2006.01)
*B32B 27/12* (2006.01)
*B32B 27/40* (2006.01)

(52) U.S. Cl.
CPC .............. *B32B 5/10* (2013.01); *B32B 5/12* (2013.01); *B32B 5/26* (2013.01); *B32B 7/045* (2013.01); *B32B 7/08* (2013.01); *B32B 7/12* (2013.01); *B32B 27/12* (2013.01); *B32B 27/40* (2013.01); *D21F 1/0036* (2013.01); *D21H 27/005* (2013.01); *B32B 2250/02* (2013.01); *B32B 2250/03* (2013.01); *B32B 2250/20* (2013.01); *B32B 2250/24* (2013.01); *B32B 2262/02* (2013.01); *B32B 2262/0284* (2013.01); *B32B 2262/0292* (2013.01); *B32B 2307/514* (2013.01); *B32B 2307/724* (2013.01); *B32B 2307/726* (2013.01); *B32B 2307/732* (2013.01); *B32B 2413/00* (2013.01); *B32B 2432/00* (2013.01)

(58) Field of Classification Search
CPC ............ B32B 2250/20; B32B 2262/02; B32B 2307/726; B32B 5/022; B32B 5/12; B32B 5/26; B32B 2250/03; B32B 2250/24; B32B 5/024; Y10S 162/90; Y10S 162/901; Y10S 162/903; D21H 27/005; Y10T 442/10; Y10T 442/30; Y10T 442/40; Y10T 442/60; D03D 11/00; D03D 13/00; D03D 15/00; D04B 21/14; D04B 39/06
See application file for complete search history.

(56) References Cited

U.S. PATENT DOCUMENTS

| | | |
|---|---|---|
| 3,026,231 A | 3/1962 | Chavannes |
| 3,049,469 A | 8/1962 | Davison |
| 3,058,873 A | 10/1962 | Keim et al. |
| 3,066,066 A | 11/1962 | Keim et al. |
| 3,097,994 A | 7/1963 | Dickens et al. |
| 3,125,552 A | 3/1964 | Loshaek et al. |
| 3,143,150 A | 8/1964 | Buchanan |
| 3,186,900 A | 6/1965 | De Young |
| 3,197,427 A | 7/1965 | Schmalz |
| 3,224,986 A | 12/1965 | Butler et al. |
| 3,224,990 A | 12/1965 | Babcock |
| 3,227,615 A | 1/1966 | Korden |
| 3,227,671 A | 1/1966 | Keim |
| 3,239,491 A | 3/1966 | Tsou et al. |
| 3,240,664 A | 3/1966 | Earle, Jr. |
| 3,240,761 A | 3/1966 | Keim et al. |
| 3,248,280 A | 4/1966 | Hyland, Jr. |
| 3,250,664 A | 5/1966 | Conte et al. |
| 3,252,181 A | 5/1966 | Hureau |
| 3,301,746 A | 1/1967 | Sanford et al. |
| 3,311,594 A | 3/1967 | Earle, Jr. |
| 3,329,657 A | 7/1967 | Strazdins et al. |
| 3,332,834 A | 7/1967 | Reynolds, Jr. |
| 3,332,901 A | 7/1967 | Keim |
| 3,352,833 A | 11/1967 | Earle, Jr. |
| 3,384,692 A | 5/1968 | Galt et al. |
| 3,414,459 A | 12/1968 | Wells |
| 3,442,754 A | 5/1969 | Espy |
| 3,459,697 A | 8/1969 | Goldberg et al. |
| 3,473,576 A | 10/1969 | Amneus |
| 3,483,077 A | 12/1969 | Aldrich |
| 3,545,165 A | 12/1970 | Greenwell |
| 3,556,932 A | 1/1971 | Coscia et al. |
| 3,573,164 A | 3/1971 | Friedberg et al. |
| 3,609,126 A | 9/1971 | Asao et al. |
| 3,666,609 A | 5/1972 | Kalwaites et al. |
| 3,672,949 A | 6/1972 | Brown |
| 3,672,950 A | 6/1972 | Murphy et al. |
| 3,773,290 A | 11/1973 | Mowery |
| 3,778,339 A | 12/1973 | Williams et al. |
| 3,813,362 A | 5/1974 | Coscia et al. |
| 3,855,158 A | 12/1974 | Petrovich et al. |
| 3,877,510 A | 4/1975 | Tegtmeier et al. |
| 3,905,863 A | 9/1975 | Ayers |
| 3,911,173 A | 10/1975 | Sprague, Jr. |
| 3,974,025 A | 8/1976 | Ayers |
| 3,994,771 A | 11/1976 | Morgan, Jr. et al. |
| 3,998,690 A | 12/1976 | Lyness et al. |
| 4,038,008 A | 7/1977 | Larsen |
| 4,075,382 A | 2/1978 | Chapman et al. |
| 4,088,528 A | 5/1978 | Berger et al. |
| 4,098,632 A | 7/1978 | Sprague, Jr. |
| 4,102,737 A | 7/1978 | Morton |
| 4,129,528 A | 12/1978 | Petrovich et al. |
| 4,147,586 A | 4/1979 | Petrovich et al. |
| 4,184,519 A | 1/1980 | McDonald et al. |
| 4,187,618 A * | 2/1980 | Diehl ................ D21F 7/083 139/383 A |
| 4,190,692 A | 2/1980 | Larsen |
| 4,191,609 A | 3/1980 | Trokhan |
| 4,252,761 A | 2/1981 | Schoggen et al. |
| 4,320,162 A | 3/1982 | Schulz |
| 4,331,510 A | 5/1982 | Wells |
| 4,382,987 A * | 5/1983 | Smart ................ D21F 7/083 139/383 A |
| 4,440,597 A | 4/1984 | Wells et al. |
| 4,501,862 A | 2/1985 | Keim |
| 4,507,351 A | 3/1985 | Johnson et al. |
| 4,514,345 A | 4/1985 | Johnson et al. |
| 4,515,657 A | 5/1985 | Maslanka |
| 4,528,239 A | 7/1985 | Trokhan |
| 4,529,480 A | 7/1985 | Trokhan |
| 4,537,657 A | 8/1985 | Keim |
| 4,545,857 A | 10/1985 | Wells |
| 4,637,859 A | 1/1987 | Trokhan |
| 4,678,590 A | 7/1987 | Nakamura et al. |
| 4,714,736 A | 12/1987 | Juhl et al. |
| 4,770,920 A | 9/1988 | Larsonneur |
| 4,780,357 A | 10/1988 | Akao |
| 4,808,467 A | 2/1989 | Suskind et al. |
| 4,836,894 A | 6/1989 | Chance et al. |
| 4,849,054 A | 7/1989 | Klowak |
| 4,885,202 A | 12/1989 | Lloyd et al. |
| 4,891,249 A | 1/1990 | McIntyre |
| 4,909,284 A | 3/1990 | Kositake |
| 4,949,668 A | 8/1990 | Heindel et al. |
| 4,949,688 A | 8/1990 | Bayless |
| 4,983,256 A | 1/1991 | Combette et al. |
| 4,996,091 A | 2/1991 | McIntyre |
| 5,059,282 A | 10/1991 | Ampulski et al. |
| 5,143,776 A | 9/1992 | Givens |
| 5,149,401 A | 9/1992 | Langevin et al. |
| 5,152,874 A | 10/1992 | Keller |
| 5,211,813 A | 5/1993 | Sawley et al. |
| 5,239,047 A | 8/1993 | Devore et al. |
| 5,279,098 A | 1/1994 | Fukuda |
| 5,281,306 A | 1/1994 | Kakiuchi et al. |
| 5,334,289 A | 8/1994 | Trokhan et al. |
| 5,347,795 A | 9/1994 | Fukuda |
| 5,397,435 A | 3/1995 | Ostendorf et al. |
| 5,399,412 A | 3/1995 | Sudall et al. |
| 5,405,501 A | 4/1995 | Phan et al. |
| 5,409,572 A | 4/1995 | Kershaw et al. |
| 5,429,686 A | 7/1995 | Chiu et al. |
| 5,439,559 A | 8/1995 | Crouse |
| 5,447,012 A | 9/1995 | Kovacs et al. |
| 5,470,436 A | 11/1995 | Wagle et al. |

(56) References Cited

U.S. PATENT DOCUMENTS

| | | |
|---|---|---|
| 5,487,313 A | 1/1996 | Johnson |
| 5,509,913 A | 4/1996 | Yeo |
| 5,510,002 A | 4/1996 | Hermans et al. |
| 5,529,665 A | 6/1996 | Kaun |
| 5,581,906 A | 12/1996 | Ensign et al. |
| 5,591,147 A | 1/1997 | Couture-Dorschner et al. |
| 5,607,551 A | 3/1997 | Farrington, Jr. et al. |
| 5,611,890 A | 3/1997 | Vinson et al. |
| 5,628,876 A | 5/1997 | Ayers et al. |
| 5,635,028 A | 6/1997 | Vinson et al. |
| 5,649,916 A | 7/1997 | Dipalma et al. |
| 5,671,897 A | 9/1997 | Ogg et al. |
| 5,672,248 A | 9/1997 | Wendt et al. |
| 5,679,222 A | 10/1997 | Rasch et al. |
| 5,685,428 A | 11/1997 | Herbers et al. |
| 5,728,268 A | 3/1998 | Weisman et al. |
| 5,746,887 A | 5/1998 | Wendt et al. |
| 5,753,067 A | 5/1998 | Fukuda et al. |
| 5,772,845 A | 6/1998 | Farrington, Jr. et al. |
| 5,806,569 A | 9/1998 | Gulya et al. |
| 5,827,384 A | 10/1998 | Canfield et al. |
| 5,832,962 A | 11/1998 | Kaufman et al. |
| 5,846,380 A | 12/1998 | Van Phan et al. |
| 5,855,738 A | 1/1999 | Weisman et al. |
| 5,858,554 A | 1/1999 | Neal et al. |
| 5,865,396 A | 2/1999 | Ogg et al. |
| 5,865,950 A | 2/1999 | Vinson et al. |
| 5,893,965 A | 4/1999 | Trokhan et al. |
| 5,913,765 A | 6/1999 | Burgess et al. |
| 5,942,085 A | 8/1999 | Neal et al. |
| 5,944,954 A | 8/1999 | Vinson et al. |
| 5,948,210 A | 9/1999 | Huston |
| 5,980,691 A | 11/1999 | Weisman et al. |
| 6,036,139 A | 3/2000 | Ogg |
| 6,039,838 A | 3/2000 | Kaufman et al. |
| 6,048,938 A | 4/2000 | Neal et al. |
| 6,060,149 A | 5/2000 | Nissing et al. |
| 6,106,670 A | 8/2000 | Weisman et al. |
| 6,149,769 A | 11/2000 | Mohammadi et al. |
| 6,162,327 A | 12/2000 | Batra et al. |
| 6,162,329 A | 12/2000 | Vinson et al. |
| 6,187,138 B1 | 2/2001 | Neal et al. |
| 6,200,419 B1 | 3/2001 | Phan |
| 6,203,667 B1 | 3/2001 | Huhtelin |
| 6,207,734 B1 | 3/2001 | Vinson et al. |
| 6,231,723 B1 | 5/2001 | Kanitz et al. |
| 6,287,426 B1 | 9/2001 | Edwards et al. |
| 6,303,233 B1 | 10/2001 | Amon et al. |
| 6,319,362 B1 | 11/2001 | Huhtelin et al. |
| 6,344,111 B1 | 2/2002 | Wilhelm |
| 6,419,795 B1 * | 7/2002 | Dutt .................. D21F 3/0227 162/358.4 |
| 6,420,013 B1 | 7/2002 | Vinson et al. |
| 6,420,100 B1 | 7/2002 | Trokhan et al. |
| 6,423,184 B2 | 7/2002 | Vahatalo et al. |
| 6,458,246 B1 | 10/2002 | Kanitz et al. |
| 6,464,831 B1 | 10/2002 | Trokhan et al. |
| 6,473,670 B1 | 10/2002 | Huhtelin |
| 6,521,089 B1 | 2/2003 | Griech et al. |
| 6,537,407 B1 | 3/2003 | Law et al. |
| 6,547,928 B2 | 4/2003 | Barnholtz et al. |
| 6,551,453 B2 | 4/2003 | Weisman et al. |
| 6,551,691 B1 | 4/2003 | Hoeft et al. |
| 6,572,722 B1 | 6/2003 | Pratt |
| 6,579,416 B1 | 6/2003 | Vinson et al. |
| 6,602,454 B2 | 8/2003 | McGuire et al. |
| 6,607,637 B1 | 8/2003 | Vinson et al. |
| 6,610,173 B1 | 8/2003 | Lindsay et al. |
| 6,613,194 B2 | 9/2003 | Kanitz et al. |
| 6,660,362 B1 | 12/2003 | Lindsay et al. |
| 6,673,202 B2 | 1/2004 | Burazin |
| 6,701,637 B2 | 5/2004 | Lindsay et al. |
| 6,755,939 B2 | 6/2004 | Vinson et al. |
| 6,773,647 B2 | 8/2004 | McGuire et al. |
| 6,797,117 B1 | 9/2004 | McKay et al. |
| 6,808,599 B2 | 10/2004 | Burazin |
| 6,821,386 B2 | 11/2004 | Weisman et al. |
| 6,821,391 B2 | 11/2004 | Scherb et al. |
| 6,827,818 B2 | 12/2004 | Farrington, Jr. et al. |
| 6,863,777 B2 | 3/2005 | Kanitz et al. |
| 6,896,767 B2 | 5/2005 | Wilhelm |
| 6,939,443 B2 | 9/2005 | Ryan et al. |
| 6,998,017 B2 | 2/2006 | Lindsay et al. |
| 6,998,024 B2 | 2/2006 | Burazin |
| 7,005,043 B2 | 2/2006 | Toney et al. |
| 7,014,735 B2 | 3/2006 | Kramer et al. |
| 7,105,465 B2 | 9/2006 | Patel et al. |
| 7,155,876 B2 | 1/2007 | VanderTuin et al. |
| 7,157,389 B2 | 1/2007 | Branham et al. |
| 7,182,837 B2 | 2/2007 | Chen et al. |
| 7,194,788 B2 | 3/2007 | Clark et al. |
| 7,235,156 B2 | 6/2007 | Baggot |
| 7,269,929 B2 | 9/2007 | VanderTuin et al. |
| 7,294,230 B2 | 11/2007 | Flugge-Berendes et al. |
| 7,311,853 B2 | 12/2007 | Vinson et al. |
| 7,328,550 B2 | 2/2008 | Floding et al. |
| 7,339,378 B2 | 3/2008 | Han et al. |
| 7,351,307 B2 | 4/2008 | Scherb et al. |
| 7,387,706 B2 | 6/2008 | Herman et al. |
| 7,399,378 B2 | 7/2008 | Edwards et al. |
| 7,419,569 B2 | 9/2008 | Hermans |
| 7,427,434 B2 | 9/2008 | Busam |
| 7,431,801 B2 | 10/2008 | Conn et al. |
| 7,432,309 B2 | 10/2008 | Vinson |
| 7,442,278 B2 | 10/2008 | Murray et al. |
| 7,452,447 B2 | 11/2008 | Duan et al. |
| 7,476,293 B2 | 1/2009 | Herman et al. |
| 7,494,563 B2 | 2/2009 | Edwards et al. |
| 7,510,631 B2 | 3/2009 | Scherb et al. |
| 7,513,975 B2 | 4/2009 | Burma |
| 7,563,344 B2 | 7/2009 | Beuther |
| 7,582,187 B2 | 9/2009 | Scherb et al. |
| 7,611,607 B2 | 11/2009 | Mullally et al. |
| 7,622,020 B2 | 11/2009 | Awofeso |
| 7,662,462 B2 | 2/2010 | Noda |
| 7,670,678 B2 | 3/2010 | Phan |
| 7,683,126 B2 | 3/2010 | Neal et al. |
| 7,686,923 B2 | 3/2010 | Scherb et al. |
| 7,687,140 B2 | 3/2010 | Manifold et al. |
| 7,691,230 B2 | 4/2010 | Scherb et al. |
| 7,744,722 B1 | 6/2010 | Tucker et al. |
| 7,744,726 B2 | 6/2010 | Scherb et al. |
| 7,799,382 B2 | 9/2010 | Payne et al. |
| 7,811,418 B2 | 10/2010 | Klerelid et al. |
| 7,815,978 B2 | 10/2010 | Davenport et al. |
| 7,823,366 B2 | 11/2010 | Schoeneck |
| 7,842,163 B2 | 11/2010 | Nickel et al. |
| 7,867,361 B2 | 1/2011 | Salaam et al. |
| 7,871,692 B2 | 1/2011 | Morin et al. |
| 7,887,673 B2 | 2/2011 | Andersson et al. |
| 7,905,989 B2 | 3/2011 | Scherb et al. |
| 7,914,866 B2 | 3/2011 | Shannon et al. |
| 7,931,781 B2 | 4/2011 | Scherb et al. |
| 7,951,269 B2 | 5/2011 | Herman et al. |
| 7,955,549 B2 | 6/2011 | Noda |
| 7,959,764 B2 | 6/2011 | Ringer et al. |
| 7,972,475 B2 | 7/2011 | Chan et al. |
| 7,989,058 B2 | 8/2011 | Manifold et al. |
| 8,034,463 B2 | 10/2011 | Leimbach et al. |
| 3,051,629 A1 | 11/2011 | Pazdernik et al. |
| 8,075,739 B2 | 12/2011 | Scherb et al. |
| 8,092,652 B2 | 1/2012 | Scherb et al. |
| 8,118,979 B2 | 2/2012 | Herman et al. |
| 8,147,649 B1 | 4/2012 | Tucker et al. |
| 8,152,959 B2 | 4/2012 | Elony et al. |
| 8,196,314 B2 | 6/2012 | Munch |
| 8,216,427 B2 | 7/2012 | Klerelid et al. |
| 8,236,135 B2 | 8/2012 | Prodoehl et al. |
| 8,303,773 B2 | 11/2012 | Scherb et al. |
| 8,382,956 B2 | 2/2013 | Boechat et al. |
| 8,402,673 B2 | 3/2013 | Da Silva et al. |
| 8,409,404 B2 | 4/2013 | Harper et al. |
| 8,435,384 B2 | 5/2013 | Da Silva et al. |
| 8,440,055 B2 | 5/2013 | Scherb et al. |

(56) References Cited

U.S. PATENT DOCUMENTS

| | | |
|---|---|---|
| 8,445,032 B2 | 5/2013 | Topolkaraev et al. |
| 8,454,800 B2 | 6/2013 | Mourad et al. |
| 8,470,133 B2 | 6/2013 | Cunnane et al. |
| 8,506,756 B2 | 8/2013 | Denis et al. |
| 8,544,184 B2 | 10/2013 | Da Silva et al. |
| 8,574,211 B2 | 11/2013 | Morita |
| 8,580,083 B2 | 11/2013 | Boechat et al. |
| 8,728,277 B2 | 5/2014 | Boechat et al. |
| 8,758,569 B2 | 6/2014 | Aberg et al. |
| 8,771,466 B2 | 7/2014 | Denis et al. |
| 8,801,903 B2 | 8/2014 | Mourad et al. |
| 8,815,057 B2 | 8/2014 | Eberhardt et al. |
| 8,822,009 B2 | 9/2014 | Riviere et al. |
| 8,968,517 B2 | 3/2015 | Ramaratnam et al. |
| 8,980,062 B2 | 3/2015 | Karlsson et al. |
| 9,005,710 B2 | 4/2015 | Jones et al. |
| D734,617 S | 7/2015 | Seitzinger et al. |
| 9,095,477 B2 | 8/2015 | Yamaguchi |
| D738,633 S | 9/2015 | Seitzinger et al. |
| 9,315,940 B2 * | 4/2016 | Lee .................... D21F 7/10 |
| 9,382,666 B2 | 7/2016 | Ramaratnam et al. |
| 9,506,203 B2 | 11/2016 | Ramaratnam et al. |
| 9,580,872 B2 | 2/2017 | Ramaratnam et al. |
| 9,702,089 B2 | 7/2017 | Ramaratnam et al. |
| 9,702,090 B2 | 7/2017 | Ramaratnam et al. |
| 9,719,213 B2 | 8/2017 | Miller, IV et al. |
| 9,725,853 B2 | 8/2017 | Ramaratnam et al. |
| 2001/0018068 A1 | 8/2001 | Lorenzi et al. |
| 2002/0028230 A1 | 3/2002 | Eichhorn et al. |
| 2002/0060049 A1 | 5/2002 | Kanitz et al. |
| 2002/0061386 A1 | 5/2002 | Carson et al. |
| 2002/0098317 A1 | 7/2002 | Jaschinski et al. |
| 2002/0110655 A1 | 8/2002 | Seth |
| 2002/0115194 A1 | 8/2002 | Lange et al. |
| 2002/0125606 A1 | 9/2002 | McGuire et al. |
| 2003/0024674 A1 | 2/2003 | Kanitz et al. |
| 2003/0056911 A1 | 3/2003 | Hermans et al. |
| 2003/0056917 A1 | 3/2003 | Jimenez |
| 2003/0070781 A1 | 4/2003 | Hermans et al. |
| 2003/0114071 A1 | 6/2003 | Everhart et al. |
| 2003/0159401 A1 | 8/2003 | Sorensson et al. |
| 2003/0188843 A1 | 10/2003 | Kanitz et al. |
| 2003/0218274 A1 | 11/2003 | Boutilier et al. |
| 2004/0118531 A1 | 6/2004 | Shannon et al. |
| 2004/0123963 A1 | 7/2004 | Chen et al. |
| 2004/0126601 A1 * | 7/2004 | Kramer ................ B29C 39/18 |
| | | 428/480 |
| 2004/0126710 A1 | 7/2004 | Hill et al. |
| 2004/0168784 A1 | 9/2004 | Duan et al. |
| 2004/0173333 A1 | 9/2004 | Hermans et al. |
| 2004/0234804 A1 | 11/2004 | Liu et al. |
| 2005/0016704 A1 | 1/2005 | Huhtelin |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0112115 A1 | 5/2005 | Khan |
| 2005/0123726 A1 | 6/2005 | Broering et al. |
| 2005/0130536 A1 | 6/2005 | Siebers et al. |
| 2005/0136222 A1 | 6/2005 | Hada et al. |
| 2005/0148257 A1 | 7/2005 | Hermans et al. |
| 2005/0150626 A1 | 7/2005 | Kanitz et al. |
| 2005/0166551 A1 | 8/2005 | Keane et al. |
| 2005/0241786 A1 | 11/2005 | Edwards et al. |
| 2005/0241788 A1 | 11/2005 | Baggot et al. |
| 2005/0252626 A1 | 11/2005 | Chen et al. |
| 2005/0280184 A1 | 12/2005 | Sayers et al. |
| 2005/0287340 A1 | 12/2005 | Morelli et al. |
| 2006/0005916 A1 | 1/2006 | Stelljes et al. |
| 2006/0013998 A1 | 1/2006 | Stelljes et al. |
| 2006/0019567 A1 | 1/2006 | Sayers |
| 2006/0083899 A1 | 4/2006 | Burazin et al. |
| 2006/0093788 A1 | 5/2006 | Behm et al. |
| 2006/0113049 A1 | 6/2006 | Knobloch et al. |
| 2006/0130986 A1 | 6/2006 | Flugge-Berendes et al. |
| 2006/0194022 A1 | 8/2006 | Boutilier et al. |
| 2006/0269706 A1 | 11/2006 | Shannon et al. |
| 2007/0020315 A1 | 1/2007 | Shannon et al. |
| 2007/0131366 A1 | 6/2007 | Underhill et al. |
| 2007/0137813 A1 | 6/2007 | Nickel et al. |
| 2007/0137814 A1 | 6/2007 | Gao |
| 2007/0170610 A1 | 7/2007 | Payne et al. |
| 2007/0240842 A1 | 10/2007 | Scherb et al. |
| 2007/0251659 A1 | 11/2007 | Fernandes et al. |
| 2007/0251660 A1 | 11/2007 | Walkenhaus et al. |
| 2007/0267157 A1 | 11/2007 | Kanitz et al. |
| 2007/0272381 A1 | 11/2007 | Elony et al. |
| 2007/0275866 A1 | 11/2007 | Dykstra |
| 2007/0298221 A1 | 12/2007 | Vinson |
| 2008/0035289 A1 | 2/2008 | Edwards et al. |
| 2008/0076695 A1 | 3/2008 | Uitenbroek et al. |
| 2008/0156450 A1 | 7/2008 | Klerelid et al. |
| 2008/0199655 A1 | 8/2008 | Monnerie et al. |
| 2008/0245498 A1 | 10/2008 | Ostendorf et al. |
| 2008/0302493 A1 | 12/2008 | Boatman et al. |
| 2008/0308247 A1 | 12/2008 | Ringer et al. |
| 2009/0020248 A1 | 1/2009 | Sumnicht et al. |
| 2009/0056892 A1 | 3/2009 | Rekoske |
| 2009/0061709 A1 | 3/2009 | Nakai et al. |
| 2009/0205797 A1 | 8/2009 | Fernandes et al. |
| 2009/0218056 A1 | 9/2009 | Manifold et al. |
| 2010/0065234 A1 | 3/2010 | Klerelid et al. |
| 2010/0119779 A1 | 5/2010 | Ostendort et al. |
| 2010/0224338 A1 | 9/2010 | Harper et al. |
| 2010/0230064 A1 | 9/2010 | Eagles et al. |
| 2010/0236034 A1 | 9/2010 | Eagles et al. |
| 2010/0239825 A1 | 9/2010 | Sheehan et al. |
| 2010/0272965 A1 | 10/2010 | Schinkoreit et al. |
| 2011/0027545 A1 | 2/2011 | Harlacher et al. |
| 2011/0180223 A1 | 7/2011 | Klerelid et al. |
| 2011/0189435 A1 | 8/2011 | Manifold et al. |
| 2011/0189442 A1 | 8/2011 | Manifold et al. |
| 2011/0206913 A1 | 8/2011 | Manifold et al. |
| 2011/0223381 A1 | 9/2011 | Sauter et al. |
| 2011/0253329 A1 | 10/2011 | Manifold et al. |
| 2011/0265967 A1 | 11/2011 | Van Phan |
| 2011/0303379 A1 | 12/2011 | Boechat et al. |
| 2012/0144611 A1 | 6/2012 | Baker et al. |
| 2012/0152475 A1 | 6/2012 | Edwards et al. |
| 2012/0177888 A1 | 7/2012 | Escafere et al. |
| 2012/0244241 A1 | 9/2012 | McNeil |
| 2012/0267063 A1 | 10/2012 | Klerelid et al. |
| 2012/0297560 A1 | 11/2012 | Zwick et al. |
| 2013/0008135 A1 | 1/2013 | Moore et al. |
| 2013/0029105 A1 | 1/2013 | Miller et al. |
| 2013/0029106 A1 | 1/2013 | Lee et al. |
| 2013/0133851 A1 | 5/2013 | Boechat et al. |
| 2013/0150817 A1 | 6/2013 | Kainth et al. |
| 2013/0160960 A1 | 6/2013 | Hermans et al. |
| 2013/0209749 A1 | 8/2013 | Myangiro et al. |
| 2013/0220566 A1 * | 8/2013 | Straub .................. D21F 1/0063 |
| | | 162/289 |
| 2013/0248129 A1 | 9/2013 | Manifold et al. |
| 2013/0327487 A1 | 12/2013 | Espinosa et al. |
| 2014/0004307 A1 | 1/2014 | Sheehan |
| 2014/0041820 A1 | 2/2014 | Ramaratnam et al. |
| 2014/0041822 A1 | 2/2014 | Boechat et al. |
| 2014/0050890 A1 | 2/2014 | Zwick et al. |
| 2014/0053994 A1 | 2/2014 | Manifold et al. |
| 2014/0096924 A1 | 4/2014 | Rekokske et al. |
| 2014/0182798 A1 | 7/2014 | Polat et al. |
| 2014/0242320 A1 | 8/2014 | McNeil et al. |
| 2014/0272269 A1 * | 9/2014 | Hansen ................ D21F 1/0036 |
| | | 428/111 |
| 2014/0272747 A1 | 9/2014 | Ciurkot |
| 2014/0284237 A1 | 9/2014 | Gosset |
| 2014/0360519 A1 | 12/2014 | George et al. |
| 2015/0059995 A1 | 3/2015 | Ramaratnam et al. |
| 2015/0102526 A1 | 4/2015 | Ward et al. |
| 2015/0129145 A1 | 5/2015 | Chou et al. |
| 2015/0211179 A1 * | 7/2015 | Alias .................... D21F 1/0027 |
| | | 162/289 |
| 2015/0241788 A1 | 8/2015 | Yamaguchi |
| 2015/0330029 A1 | 11/2015 | Ramaratnam et al. |
| 2016/0060811 A1 | 3/2016 | Riding et al. |

(56) References Cited

U.S. PATENT DOCUMENTS

| | | | |
|---|---|---|---|
| 2016/0069022 A1* | 3/2016 | Lee | D21F 7/10 162/202 |
| 2016/0090692 A1 | 3/2016 | Eagles et al. | |
| 2016/0090693 A1 | 3/2016 | Eagles et al. | |
| 2016/0101590 A1* | 4/2016 | Kane | D21J 1/06 428/141 |
| 2016/0130762 A1 | 5/2016 | Ramaratnam et al. | |
| 2016/0145810 A1 | 5/2016 | Miller, IV et al. | |
| 2016/0159007 A1 | 6/2016 | Miller, IV et al. | |
| 2016/0160448 A1 | 6/2016 | Miller, IV et al. | |
| 2016/0185041 A1 | 6/2016 | Topolkaraev et al. | |
| 2016/0185050 A1 | 6/2016 | Topolkaraev et al. | |
| 2016/0273168 A1 | 9/2016 | Ramaratnam et al. | |
| 2016/0273169 A1 | 9/2016 | Ramaratnam et al. | |
| 2016/0289897 A1 | 10/2016 | Ramaratnam et al. | |
| 2016/0289898 A1 | 10/2016 | Ramaratnam et al. | |
| 2017/0044717 A1 | 2/2017 | Quigley | |
| 2017/0101741 A1 | 4/2017 | Sealey et al. | |
| 2017/0167082 A1 | 6/2017 | Ramaratnam et al. | |
| 2017/0226698 A1 | 8/2017 | LeBrun et al. | |
| 2017/0233946 A1* | 8/2017 | Sealey | D21F 7/083 162/111 |
| 2017/0253422 A1 | 9/2017 | Anklam et al. | |
| 2017/0268178 A1 | 9/2017 | Ramaratnam et al. | |
| 2018/0066399 A1* | 3/2018 | Sealey | D21F 1/0036 |

FOREIGN PATENT DOCUMENTS

| | | | |
|---|---|---|---|
| CN | 1138356 | A | 12/1996 |
| CN | 1207149 | A | 2/1999 |
| CN | 1244899 | A | 2/2000 |
| CN | 1268559 | A | 10/2000 |
| CN | 1377405 | A | 10/2002 |
| CN | 2728254 | Y | 9/2005 |
| DE | 4242539 | A1 | 8/1993 |
| EP | 0097036 | A2 | 12/1983 |
| EP | 0979895 | A1 | 2/2000 |
| EP | 1911574 | A1 | 1/2007 |
| EP | 1339915 | B1 | 7/2007 |
| EP | 2123826 | A2 | 5/2009 |
| GB | 946093 | A | 1/1964 |
| JP | 2013208298 | A | 10/2013 |
| JP | 2014213138 | A | 11/2014 |
| WO | 96/06223 | A1 | 2/1996 |
| WO | 200382550 | A2 | 10/2003 |
| WO | 200445834 | A1 | 6/2004 |
| WO | 2007070145 | A1 | 6/2007 |
| WO | 2008019702 | A1 | 2/2008 |
| WO | 2009006709 | A1 | 1/2009 |
| WO | 2009/061079 | A1 | 5/2009 |
| WO | 2009067079 | A1 | 5/2009 |
| WO | 2011028823 | A1 | 3/2011 |
| WO | 2012003360 | A2 | 1/2012 |
| WO | 2013024297 | A1 | 2/2013 |
| WO | 2013136471 | A1 | 9/2013 |
| WO | 2014/022848 | A1 | 2/2014 |
| WO | 201500755 | A1 | 1/2015 |
| WO | 2015/176063 | A1 | 11/2015 |
| WO | 2016/077594 | A1 | 5/2016 |
| WO | 2016/086019 | A1 | 6/2016 |
| WO | 2016/090242 | A1 | 6/2016 |
| WO | 2016/090364 | A1 | 6/2016 |
| WO | 2016085704 | A1 | 6/2016 |
| WO | 2017066465 | A1 | 4/2017 |
| WO | 2017066656 | A1 | 4/2017 |
| WO | 2017139786 | A1 | 8/2017 |
| WO | WO-2017139786 | A1 * | 8/2017 ............. D21F 7/083 |

OTHER PUBLICATIONS

Supplementary European Search Report of EP 13 82 6461 dated Apr. 1, 2016.
International Search Report for PCT/US16/56871 dated Jan. 12, 2017.
Written Opinion of International Searching Authority for PCT/US16/56871 dated Jan. 12, 2017.
International Search Report for PCT/US2016/057163 dated Dec. 23, 2016.
Written Opinion of International Searching Authority for PCT/US2016/057163 dated Dec. 23, 2016.
International Search Report for PCT/US2017/029890 dated Jul. 14, 2017.
Written Opinion of International Searching Authority for PCT/US2017/029890 dated Jul. 14, 2017.
International Search Report for PCT/US2017/032746 dated Aug. 7, 2017.
Written Opinion of International Searching Authority for PCT/US2017/032746 dated Aug. 7, 2017.
International Search Report for PCT/US17/17705 dated Jun. 9, 2017.
Written Opinion of International Searching Authority for PCT/US17/17705 dated Jun. 9, 2017.
Written Opinion of International Searching Authority for PCT/US15/62483 dated May 6, 2016.
International Search Report for PCT/US15/63986 dated Mar. 29, 2016.
Written Opinion of International Searching Authority for PCT/US15/63986 dated Mar. 29, 2016.
International Search Report for PCT/US15/64284 dated Feb. 11, 2016.
Written Opinion of International Searching Authority for PCT/US15/64284 dated Feb. 11, 2016.
International Search Report for PCT/US13/53593 dated Dec. 30, 2013.
Written Opinion of International Searching Authority for PCT/US13/53593 dated Dec. 30, 2013.
International Search Report for PCT/US15/31411 dated Aug. 13, 2015.
Written Opinion of International Searching Authority for PCT/US15/31411 dated Aug. 13, 2015.
International Search Report for PCT/US15/60398 dated Jan. 29, 2016.
Written Opinion of International Searching Authority for PCT/US15/60398 dated Jan. 29, 2016.
International Search Report for PCT/US15/62483 dated May 6, 2016.

* cited by examiner

BELT OR FABRIC INCLUDING POLYMERIC LAYER FOR PAPERMAKING MACHINE

RELATED APPLICATIONS

This application is a non-provisional based on and claiming priority to U.S. Provisional Patent Application No. 62/294,158, filed Feb. 11, 2016, and entitled BELT OR FABRIC INCLUDING POLYMERIC LAYER FOR PAPERMAKING MACHINE, the contents of which are incorporated herein by reference in their entirety.

FIELD OF THE INVENTION

This disclosure relates to fabrics or belts for a papermaking machine, and in particular to fabrics or belts that include polymeric layers and that are intended for use on papermaking machines for the production of tissue products.

BACKGROUND

Tissue manufacturers that can deliver the highest quality product at the lowest cost have a competitive advantage in the marketplace. A key component in determining the cost and quality of a tissue product is the manufacturing process utilized to create the product. For tissue products, there are several manufacturing processes available including conventional dry crepe, through air drying (TAD), or "hybrid" technologies such as Valmet's NTT and QRT processes, Georgia Pacific's ETAD, and Voith's ATMOS process. Each has differences as to installed capital cost, raw material utilization, energy cost, production rates, and the ability to generate desired attributes such as softness, strength, and absorbency.

Conventional manufacturing processes include a forming section designed to retain the fiber, chemical, and filler recipe while allowing the water to drain from the web. Many types of forming sections, such as inclined suction breast roll, twin wire C-wrap, twin wire S-wrap, suction forming roll, and Crescent formers, include the use of forming fabrics.

Forming fabrics are woven structures that utilize monofilaments (such as yarns or threads) composed of synthetic polymers (usually polyethylene, polypropylene, or nylon). A forming fabric has two surfaces, the sheet side and the machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

Different weave patterns are utilized to control other properties such as: fabric stability, life potential, drainage, fiber support, and clean-ability. There are three basic types of forming fabrics: single layer, double layer, and triple layer. A single layer fabric is composed of one yarn system made up of cross direction (CD) yarns (also known as shute yarns) and machine direction (MD) yarns (also known as warp yarns). The main issue for single layer fabrics is a lack of dimensional stability. A double layer forming fabric has one layer of warp yarns and two layers of shute yarns. This multilayer fabric is generally more stable and resistant to stretching. Triple layer fabrics have two separate single layer fabrics bound together by separated yarns called binders. Usually the binder fibers are placed in the cross direction but can also be oriented in the machine direction. Triple layer fabrics have further increased dimensional stability, wear potential, drainage, and fiber support than single or double layer fabrics.

The manufacturing of forming fabrics includes the following operations: weaving, initial heat setting, seaming, final heat setting, and finishing. The fabric is made in a loom using two interlacing sets of monofilaments (or threads or yarns). The longitudinal or machine direction threads are called warp threads and the transverse or machine direction threads are called shute threads. After weaving, the forming fabric is heated to relieve internal stresses to enhance dimensional stability of the fabric. The next step in manufacturing is seaming. This step converts the flat woven fabric into an endless forming fabric by joining the two MD ends of the fabric. After seaming, a final heat setting is applied to stabilize and relieve the stresses in the seam area. The final step in the manufacturing process is finishing, whereby the fabric is cut to width and sealed.

There are several parameters and tools used to characterize the properties of the forming fabric: mesh and count, caliper, frames, plane difference, open area, air permeability, void volume and distribution, running attitude, fiber support, drainage index, and stacking. None of these parameters can be used individually to precisely predict the performance of a forming fabric on a paper machine, but together the expected performance and sheet properties can be estimated. Examples of forming fabrics designs can be viewed in U.S. Pat. Nos. 3,143,150, 4,184,519, 4,909,284, and 5,806,569.

In a conventional dry crepe process, after web formation and drainage (to around 35% solids) in the forming section (assisted by centripetal force around the forming roll and, in some cases, vacuum boxes), a web is transferred from the forming fabric to a press fabric upon which the web is pressed between a rubber or polyurethane covered suction pressure roll and Yankee dryer. The press fabric is a permeable fabric designed to uptake water from the web as it is pressed in the press section. It is composed of large monofilaments or multi-filamentous yarns, needled with fine synthetic batt fibers to form a smooth surface for even web pressing against the Yankee dryer. Removing water via pressing reduces energy consumption.

In a conventional TAD process, rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step increases softness of the web, and affects smoothness and the bulk structure. The manufacturing method of an imprinting fabric is similar to a forming fabric (see U.S. Pat. Nos. 3,473,576, 3,573,164, 3,905,863, 3,974,025, and 4,191,609 for examples) except for an additional step if an overlaid polymer is utilized.

Imprinting fabrics with an overlaid polymer are disclosed in U.S. Pat. Nos. 5,679,222, 4,514,345, 5,334,289, 4,528, 239 and 4,637,859. Specifically, these patents disclose a method of forming a fabric in which a patterned resin is applied over a woven substrate. The patterned resin completely penetrates the woven substrate. The top surface of the patterned resin is flat and openings in the resin have sides that follow a linear path as the sides approach and then penetrate the woven structure.

U.S. Pat. Nos. 6,610,173, 6,660,362, 6,998,017, and European Patent No. EP 1 339 915 disclose another technique for applying an overlaid resin to a woven imprinting fabric.

After imprinting, the web is thermally pre-dried by moving hot air through the web while it is conveyed on the structured fabric. Thermal pre-drying can be used to dry the web to over 90% solids before the web is transferred to a steam heated cylinder. The web is then transferred from the structured fabric to the steam heated cylinder though a very low intensity nip (up to 10 times less than a conventional press nip) between a solid pressure roll and the steam heated cylinder. The portions of the web that are pressed between the pressure roll and steam cylinder rest on knuckles of the structured fabric; thereby protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process. Some TAD machines utilize fabrics (similar to dryer fabrics) to support the sheet from the crepe blade to the reel drum to aid in sheet stability and productivity. Patents which describe creped through air dried products include U.S. Pat. Nos. 3,994,771, 4,102,737, 4,529,480, and 5,510,002.

The TAD process generally has higher capital costs as compared to a conventional tissue machine due to the amount of air handling equipment needed for the TAD section. Also, the TAD process has a higher energy consumption rate due to the need to burn natural gas or other fuels for thermal pre-drying. However, the bulk softness and absorbency of a paper product made from the TAD process is superior to conventional paper due to the superior bulk generation via structured fabrics, which creates a low density, high void volume web that retains its bulk when wetted. The surface smoothness of a TAD web can approach that of a conventional tissue web. The productivity of a TAD machine is less than that of a conventional tissue machine due to the complexity of the process and the difficulty of providing a robust and stable coating package on the Yankee dryer needed for transfer and creping of a delicate a pre-dried web.

UCTAD (un-creped through air drying) is a variation of the TAD process in which the sheet is not creped, but rather dried up to 99% solids using thermal drying, blown off the structured fabric (using air), and then optionally calendered and reeled. U.S. Pat. No. 5,607,551 describes an uncreped through air dried product.

A process/method and paper machine system for producing tissue has been developed by the Voith company and is marketed under the name ATMOS. The process/method and paper machine system has several variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step of the ATMOS process is the same as that of a conventional or TAD machine. The forming process can utilize a twin wire former (as described in U.S. Pat. No. 7,744,726), a Crescent Former with a suction Forming Roll (as described in U.S. Pat. No. 6,821, 391), or a Crescent Former (as described in U.S. Pat. No. 7,387,706). The former is provided with a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a bulk structure and surface topography as described in U.S. Pat. No. 7,387,706 (FIGS. 1-11). After the forming roll, the structured and forming fabrics separate, with the web remaining in contact with the structured fabric.

The web is now transported on the structured fabric to a belt press. The belt press can have multiple configurations. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, and into the vacuum roll, thereby enhancing the moisture removal. Since both the belt and dewatering fabric are permeable, a hot air hood can be placed inside of the belt press to further enhance moisture removal. Alternately, the belt press can have a pressing device which includes several press shoes, with individual actuators to control cross direction moisture profile, or a press roll. A common arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself After the belt press, a second press is used to nip the web between the structured fabric and dewatering felt by one hard and one soft roll. The press roll under the dewatering fabric can be supplied with vacuum to further assist water removal. This belt press arrangement is described in U.S. Pat. Nos. 8,382,956 and 8,580,083, with FIG. 1 showing the arrangement. Rather than sending the web through a second press after the belt press, the web can travel through a boost dryer, a high pressure through air dryer, a two pass high pressure through air dryer or a vacuum box with hot air supply hood. U.S. Pat. Nos. 7,510,631, 7,686,923, 7,931, 781, 8,075,739, and 8,092,652 further describe methods and systems for using a belt press and structured fabric to make tissue products each having variations in fabric designs, nip pressures, dwell times, etc., and are mentioned here for reference. A wire turning roll can be also be utilized with vacuum before the sheet is transferred to a steam heated cylinder via a pressure roll nip.

The sheet is now transferred to a steam heated cylinder via a press element. The press element can be a through drilled (bored) pressure roll, a through drilled (bored) and blind drilled (blind bored) pressure roll, or a shoe press. After the web leaves this press element and before it contacts the steam heated cylinder, the % solids are in the range of 40-50%. The steam heated cylinder is coated with chemistry to aid in sticking the sheet to the cylinder at the press element nip and also to aid in removal of the sheet at the doctor blade. The sheet is dried to up to 99% solids by the steam heated cylinder and an installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, i.e., creping, is similar to that of TAD with only the knuckle sections of the web being creped. Thus, the dominant surface topography is generated by the structured fabric, with the creping process having a much smaller effect on overall softness as compared to conventional dry crepe. The web is now calendered (optional), slit, reeled and ready for the converting process.

The ATMOS process has capital costs between that of a conventional tissue machine and a TAD machine. It uses more fabrics and a more complex drying system compared to a conventional machine, but uses less equipment than a TAD machine. The energy costs are also between that of a conventional and a TAD machine due to the energy efficient hot air hood and belt press. The productivity of the ATMOS machine has been limited due to the inability of the novel belt press and hood to fully dewater the web and poor web transfer to the Yankee dryer, likely driven by poor supported coating packages, the inability of the process to utilize structured fabric release chemistry, and the inability to utilize overlaid fabrics to increase web contact area to the dryer. Poor adhesion of the web to the Yankee dryer has resulted in poor creping and stretch development which contributes to sheet handling issues in the reel section. The result is that the output of an ATMOS machine is currently below that of conventional and TAD machines. The bulk softness and absorbency is superior to conventional, but lower than a TAD web since some compaction of the sheet occurs within the belt press, especially areas of the web not protected within the pockets of the fabric. Also, bulk is limited since there is no speed differential to help drive the web into the structured fabric as exists on a TAD machine. The surface smoothness of an ATMOS web is between that of a TAD web and a conventional web primarily due to the current limitation on use of overlaid structured fabrics.

The ATMOS manufacturing technique is often described as a hybrid technology because it utilizes a structured fabric like the TAD process, but also utilizes energy efficient means to dewater the sheet like the conventional dry crepe process. Other manufacturing techniques which employ the use of a structured fabric along with an energy efficient dewatering process are the ETAD process and NTT process. The ETAD process and products are described in U.S. Pat. Nos. 7,339, 378, 7,442,278, and 7,494,563. The NTT process and products are described in WO 2009/061079 A1, US Patent Application Publication No. 2011/0180223 A1, and US Patent Application Publication No. 2010/0065234 A1. The QRT process is described in US Patent Application Publication No. 2008/0156450 A1 and U.S. Pat. No. 7,811,418. A structuring belt manufacturing process used for the NTT, QRT, and ETAD imprinting process is described in U.S. Pat. No. 8,980,062 and U.S. Patent Application Publication No. US 2010/0236034.

The NTT process involves spirally winding strips of polymeric material, such as industrial strapping or ribbon material, and adjoining the sides of the strips of material using ultrasonic, infrared, or laser welding techniques to produce an endless belt. Optionally, a filler or gap material can be placed between the strips of material and melted using the aforementioned welding techniques to join the strips of materials. The strips of polymeric material are produced by an extrusion process from any polymeric resin such as polyester, polyamide, polyurethane, polypropylene, or polyether ether ketone resins. The strip material can also be reinforced by incorporating monofilaments of polymeric material into the strips during the extrusion process or by laminating a layer of woven polymer monofilaments to the non-sheet contacting surface of a finished endless belt composed of welded strip material. The endless belt can have a textured surface produced using processes such as sanding, graving, embossing, or etching. The belt can be impermeable to air and water, or made permeable by processes such as punching, drilling, or laser drilling. Examples of structuring belts used in the NTT process can be viewed in International Publication Number WO 2009/067079 A1 and US Patent Application Publication No. 2010/0065234 A1.

As shown in the aforementioned discussion of tissue papermaking technologies, the fabrics or belts utilized are critical in the development of the tissue web structure and topography which, in turn, are instrumental in determining the quality characteristics of the web such as softness (bulk softness and surfaces smoothness) and absorbency. The manufacturing process for making these fabrics has been limited to weaving a fabric (primarily forming fabrics and structured fabrics) or a base structure and needling synthetic fibers (press fabrics) or overlaying a polymeric resin (overlaid structured fabrics) to the fabric/base structure, or welding strips of polymeric material together to form an endless belt.

Conventional overlaid structures require application of an uncured polymer resin over a woven substrate where the resin completely penetrates through the thickness of the woven structure. Certain areas of the resin are cured and other areas are uncured and washed away from the woven structure. This results is a fabric where airflow through the fabric is only possible in the Z-direction. Thus, in order for the web to dry efficiently, only highly permeable fabrics can be utilized, meaning the amount of overlaid resin applied needs to be limited. If a fabric of low permeability is produced in this manner, then drying efficiency is significantly reduced, resulting in poor energy efficiency and/or low production rates as the web must be transported slowly across the TAD drums or ATMOS drum for sufficient drying. Similarly, a welded polymer structuring layer is extremely planar and provides an even surface when laminating to a woven support layer (FIG. 9), which results in little if any air channels in the X-Y plane.

SUMMMARY OF THE INVENTION

An object of this invention is to provide an alternate process for manufacturing structured fabrics. It is also the purpose of this invention to provide a less complex, lower cost, higher production technique to produce these fabrics. This process can be used to produce structuring fabrics and forming fabrics.

In an exemplary embodiment, the inventive process uses extruded polymeric netting material to create the fabric. The extruded polymer netting is optionally laminated to additional layers of extruded polymer netting, woven polymer monofilament, or woven monofilaments or multi-filamentous yarns needled with fine synthetic batt fibers.

Another object of this invention is to provide a press section of a paper machine that can utilize the inventive structuring fabric to produce high quality, high bulk tissue paper. This press section combines the low capital cost, high production rate, low energy consumption advantages of the NTT manufacturing process, but improves the quality to levels that can be achieved with TAD technology.

The inventive process avoids the tedious and expensive conventional prior art process used to produce woven fabrics using a loom or the time, cost, and precision needed to produce welded fabrics using woven strips of polymeric material that need to be engraved, embossed, or laser drilled. The fabrics produced using the inventive process can be utilized as forming fabrics on any papermaking machine or as a structuring belt on tissue machines utilizing the TAD (creped or uncreped), NTT, QRT, ATMOS, ETAD or other hybrid processes.

In an exemplary embodiment, a low porosity structuring belt of the inventive design is used on a TAD machine where the air flows through the TAD drum from a hot air impingement hood or air cap. High air flow through the inventive structuring belt is not required to effectively dry the imprinted sheet, leading to lower heat demand and fuel consumption.

In an exemplary embodiment, a press section of a tissue machine can be used in conjunction with structured fabrics of this invention to produce high quality tissue with low capital and operational costs. This combination of high quality tissue produced at high productivity rates using low capital and operational costs is not currently available using conventional technologies.

According to an exemplary embodiment of the present invention, a fabric or belt for a papermaking machine comprises: a first layer that defines a web contacting surface, the first layer being made of extruded polymer and comprising: a plurality of first elements aligned in a first direction; a plurality of second elements aligned in a second direction and extending over the plurality of first elements; and a plurality of open portions defined by the plurality of first and second elements; and a second layer made of woven fabric that supports the first layer, wherein the first layer is bonded to the second layer so that the first layer extends only partially through the second layer and an interface formed between the first and second layers comprises airflow channels that extend in a plane parallel to the first and second layers.

According to at least one exemplary embodiment, the interface between the first and second layers comprises bonded and non-bonded portions.

According to at least one exemplary embodiment, the first layer extends into the second layer by an amount of 30 μm or less.

According to at least one exemplary embodiment, the first layer has a thickness of 0.25 mm to 1.7 mm.

According to at least one exemplary embodiment, the first layer has a thickness of 0.4 mm to 0.75 mm.

According to at least one exemplary embodiment, the first layer has a thickness of 0.5 mm to 0.6 mm.

According to at least one exemplary embodiment, the plurality of open portions repeat across the first layer in both machine and cross directions at regular intervals.

According to at least one exemplary embodiment, the plurality of open portions are rectangular-shaped open portions.

According to at least one exemplary embodiment, the rectangular-shaped open portions are defined by sides with a length of 0.25 mm to 1.0 mm.

According to at least one exemplary embodiment, the rectangular-shaped open portions are defined by sides with a length of 0.4 mm to 0.75 mm.

According to at least one exemplary embodiment, the rectangular-shaped open portions are defined by sides with a length of 0.5 mm to 0.7 mm.

According to at least one exemplary embodiment, the plurality of open portions are square-shaped open portions.

According to at least one exemplary embodiment, the plurality of open portions are circular-shaped open portions.

According to at least one exemplary embodiment, the diameter of the circular-shaped open portions is 0.25 mm to 1.0 mm.

According to at least one exemplary embodiment, the diameter of the circular-shaped open portions is 0.4 mm to 0.75 mm.

According to at least one exemplary embodiment, the diameter of the circular-shaped open portions is 0.1 mm to 0.7 mm.

According to at least one exemplary embodiment, the plurality of second elements extend above the plurality of first elements by an amount of 0.05 mm to 0.40 mm.

According to at least one exemplary embodiment, the plurality of second elements extend above the plurality of first elements by an amount of 0.1 mm to 0.3 mm.

According to at least one exemplary embodiment, the plurality of second elements extend above the plurality of first elements by an amount of 0.1 mm to 0.2 mm.

According to at least one exemplary embodiment, the plurality of second elements have a width of 0.1 mm to 0.5 mm.

According to at least one exemplary embodiment, the plurality of second elements have a width of 0.2 mm to 0.4 mm.

According to at least one exemplary embodiment, the plurality of second elements have a width of 0.25 mm to 0.3 mm.

According to at least one exemplary embodiment, the plurality of first elements have a thickness of 0.15 mm to 0.75 mm.

According to at least one exemplary embodiment, the plurality of first elements have a thickness of 0.3 mm to 0.6 mm.

According to at least one exemplary embodiment, the plurality of first elements have a thickness of 0.4 mm to 0.6 mm.

According to at least one exemplary embodiment, the plurality of first elements have a width of 0.25 mm to 1.0 mm.

According to at least one exemplary embodiment, the plurality of first elements have a width of 0.3 mm to 0.5 mm.

According to at least one exemplary embodiment, the plurality of first elements have a width of 0.4 mm to 0.5 mm.

According to at least one exemplary embodiment, the first layer is made of polymer or copolymer.

According to at least one exemplary embodiment, the first layer is made of an extruded netting tube.

According to at least one exemplary embodiment, the extruded netting tube is stretched to orient the polymer or copolymer.

According to at least one exemplary embodiment, the first layer is made of a perforated sheet.

According to at least one exemplary embodiment, the perforated sheet is stretched to orient the polymer or copolymer.

According to at least one exemplary embodiment, the perforated sheet is seamed using thermal, laser, infrared or ultraviolet seaming.

According to at least one exemplary embodiment, the second layer comprises woven polymeric monofilaments.

According to at least one exemplary embodiment, the second layer comprises woven monofilaments or multi-filamentous yarns needled with fine synthetic batt fibers.

According to at least one exemplary embodiment, the second layer has a 5 shed weave with a non-numerical warp pick sequence.

According to at least one exemplary embodiment, the second layer has a mesh of 10 to 30 frames/cm.

According to at least one exemplary embodiment, the second layer has a mesh of 15 to 25 frames/cm.

According to at least one exemplary embodiment, the second layer has a mesh of 17 to 22 frames/cm.

According to at least one exemplary embodiment, the second layer has a count of 5 to 30 frames/cm.

According to at least one exemplary embodiment, the second layer has a count of 10 to 20 frames/cm.

According to at least one exemplary embodiment, the second layer has a count of 15 to 20 frames/cm.

According to at least one exemplary embodiment, the second layer has a caliper of 0.5 mm to 1.5 mm.

According to at least one exemplary embodiment, the second layer has a caliper of 0.5 mm to 1.0 mm.

According to at least one exemplary embodiment, the second layer has a caliper of 0.5 mm to 0.75 mm.

According to at least one exemplary embodiment, the second layer is bonded to the first layer by thermal, ultrasonic, ultraviolet or infrared welding.

According to at least one exemplary embodiment, the second layer is bonded to the first layer with a 20% to 50% contact area.

According to at least one exemplary embodiment, the second layer is bonded to the first layer with a 20% to 30% contact area.

According to at least one exemplary embodiment, the second layer is bonded to the first layer with a 25% to 30% contact area.

According to at least one exemplary embodiment, the fabric or belt has an air permeability of 20 cfm to 300 cfm.

According to at least one exemplary embodiment, the fabric or belt has an air permeability of 100 cfm to 250 cfm.

According to at least one exemplary embodiment, the fabric or belt has an air permeability of 200 cfm to 250 cfm.

According to at least one exemplary embodiment, the fabric or belt is a structuring fabric configured for use on a papermaking machine.

According to at least one exemplary embodiment, the papermaking machine is a Through Air Dried, ATMOS, NTT, QRT or ETAD tissue making machine.

According to at least one exemplary embodiment, the fabric or belt is a forming fabric configured for use on a papermaking machine.

According to at least one exemplary embodiment, the plurality of second elements extend below the plurality of first elements.

According to at least one exemplary embodiment, the plurality of second elements extend below the plurality of first elements by less than 0.40 mm.

According to at least one exemplary embodiment, the plurality of second elements extend below the plurality of first elements by 0.1 mm to 0.3 mm.

According to at least one exemplary embodiment, the plurality of second elements extend below the plurality of first elements by 0.1 mm to 0.2 mm.

According to at least one exemplary embodiment, the first direction is substantially parallel to a machine cross direction.

According to at least one exemplary embodiment, the second direction is substantially parallel to a machine direction.

According to at least one exemplary embodiment, the first direction is substantially parallel to a machine direction.

According to at least one exemplary embodiment, the second direction is substantially parallel to a machine cross direction.

A fabric or belt for a papermaking machine according to an exemplary embodiment of the present invention comprises: a first layer that defines a web contacting surface, the first layer being made of extruded polymer and comprising: a plurality of first elements aligned in a first direction; a plurality of second elements aligned in a second direction and extending over the plurality of first elements; and a plurality of open portions defined by the plurality of first and second elements; and a second layer made of woven fabric that supports the first layer, wherein the first layer is bonded to the second layer so as to form an interface between the first and second layers that comprises bonded and unbonded portions and airflow channels that extend in a plane parallel to the first and second layers.

According to at least one exemplary embodiment, the first layer extends only partially through the second layer.

According to at least one exemplary embodiment, the first layer extends into the second layer by an amount of 30 μm or less.

A fabric or belt for a papermaking machine according to an exemplary embodiment of the present invention comprises: a first layer that defines a web contacting surface, the first layer comprising a plurality of grooves aligned substantially in the machine direction; and a second layer made of woven fabric that supports the first layer, wherein the first layer is bonded to the second layer so as to form an interface between the first and second layers that comprises bonded and unbonded portions and airflow channels that extend in a plane parallel to the first and second layers.

According to at least one exemplary embodiment, the plurality of grooves are angled 0.1% to 45% relative to the machine direction.

According to at least one exemplary embodiment, the plurality of grooves are angled 0.1% to 5% relative to the machine direction.

According to at least one exemplary embodiment, the plurality of grooves are angled 2% to 3% relative to the machine direction.

According to at least one exemplary embodiment, the plurality of grooves have a depth of 0.25 mm to 1.0 mm.

According to at least one exemplary embodiment, the plurality of grooves have a depth of 0.4 mm to 0.75 mm.

According to at least one exemplary embodiment, the plurality of grooves have a depth of 0.4 mm to 0.6 mm.

According to at least one exemplary embodiment, the plurality of grooves have a square, semicircular or tapered cross section.

According to at least one exemplary embodiment, the plurality of grooves are spaced 0.1 mm to 1.5 mm apart from each other.

According to at least one exemplary embodiment, the plurality of grooves are spaced 0.2 mm to 0.5 mm apart from each other.

According to at least one exemplary embodiment, the plurality of grooves are spaced 0.2 mm to 0.3 mm apart from each other.

According to at least one exemplary embodiment, the plurality of grooves are formed by laser drilling.

According to at least one exemplary embodiment, the fabric or belt is subjected to punching, drilling or laser drilling to achieve an air permeability of 20 cfm to 200 cfm.

According to at least one exemplary embodiment, the fabric or belt has an air permeability of 20 cfm to 100 cfm.

According to at least one exemplary embodiment, the fabric or belt has an air permeability of 10 cfm to 50 cfm.

A fabric or belt for a papermaking machine according to an exemplary embodiment of the present invention comprises: first layer that defines a web contacting surface, the first layer comprising: a plurality of first elements aligned in a cross direction, the plurality of first elements having a thickness of 0.3 mm to 0.6 mm and a width of 0.4 mm to 0.5 mm; a plurality of second elements aligned in a machine direction and extending over the plurality of first elements by an amount of 0.1 mm to 0.2 mm and having a width of 0.25 mm to 0.3 mm; and a plurality of open portions defined by the plurality of first and second elements and that repeat across the at least one nonwoven layer in both the machine and cross directions at regular intervals, the plurality of open portions being square shaped and defined by sides with a length of 0.5 mm to 0.7 mm; and a woven fabric layer that supports the at least one layer, wherein the fabric or belt has an air permeability of 20 cfm to 300 cfm.

A fabric or belt for a papermaking machine according to an exemplary embodiment of the present invention comprises: at least one layer that defines a web contacting surface, the at least one layer comprising: a plurality of first elements aligned in a cross direction, the plurality of first elements having a thickness of 0.3 mm to 0.6 mm and a width of 0.4 mm to 0.5 mm; a plurality of second elements aligned in a machine direction and extending over the plurality of first elements by an amount of 0.1 mm to 0.2 mm and having a width of 0.25 mm to 0.3 mm; and a plurality of open portions defined by the plurality of first and second elements and that repeat across the at least one layer in both the machine and cross directions at regular intervals, the plurality of open portions being circular shaped with a diameter of 0.5 mm to 0.7 mm; and a woven fabric layer that supports the at least one layer, wherein the fabric or belt has an air permeability of 20 cfm to 300 cfm.

A method of forming a tissue product according to an exemplary embodiment of the present invention comprises: depositing a nascent paper web onto a forming fabric of a papermaking machine so as to form a paper web; at least partially dewatering the paper web through a structuring fabric of a press section of the papermaking machine, wherein the structuring fabric comprises: a first layer that defines a web contacting surface, the first layer being made of extruded polymer and comprising: a plurality of first elements aligned in a first direction; a plurality of second elements aligned in a second direction and extending over the plurality of first elements; and a plurality of open portions defined by the plurality of first and second elements; and a second layer made of woven fabric that supports the first layer, wherein the first layer is bonded to the second layer so that the first layer extends only partially through the second layer and an interface formed between the first and second layers comprise airflow channels that extend in a plane parallel to the first and second layers; and drying the at least partially dewatered paper web at a drying section of the papermaking machine.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

Figure 1:
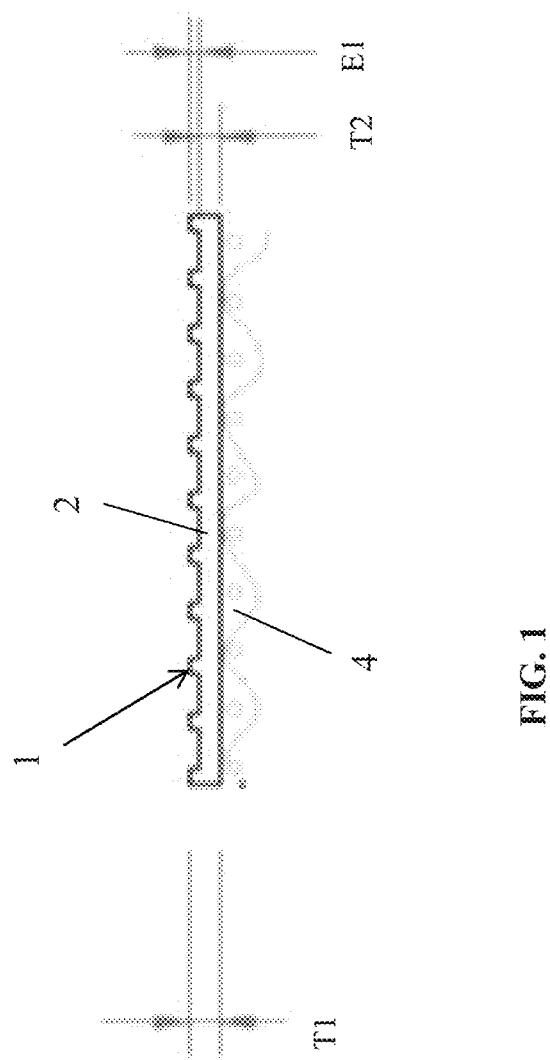
FIG. 1 is a cross-sectional view of a fabric or belt according to an exemplary embodiment of the present invention.

Current methods for manufacturing papermaking fabrics are very time consuming and expensive, requiring weaving together polymer monofilaments using a loom and optionally binding a polymer overlay, or binding strips of polymeric ribbon material together using ultrasonic, infrared, or ultraviolet welding techniques. According to an exemplary embodiment of the present invention, a layer of extruded polymeric material is formed separately from a woven fabric layer, and the layer of polymeric material is attached to the woven fabric layer to form the fabric or belt structure. The layer of polymeric material includes elevated elements that extend substantially in the machine direction or cross direction.

In an exemplary embodiment, the layer of polymeric material is extruded polymer netting. Extruded netting tubes were first manufactured around 1956 in accordance with the process described in U.S. Pat. No. 2,919,467. The process creates a polymer net which in general has diamond shaped openings extending along the length of the tube. Since this process was pioneered, it has grown tremendously, with extruded square netting tubes being described in U.S. Pat. Nos. 3,252,181, 3,384,692, and 4,038,008. Nets can also be extruded in flat sheets as described in U.S. Pat. No. 3,666,609 which are then perforated or embossed to a selected geometric configuration. Heating and stretching the netting is conducted to enlarge the openings in the net structure and orient the polymers to increase strength. Tube netting can be stretched over a cylindrical mandrel while both tube and flat sheet netting can be stretched in the longitudinal and transverse directions using several techniques. U.S. Pat. No. 4,190,692 describes a process of stretching the netting to orient the polymer and increase strength.

Today, various types of polymers can be extruded to provide the optimal level of strength, stretch, heat resistance, abrasion resistance and a variety of other physical properties. Polymers can be coextruded in layers allowing for an adhesive agent to be incorporated into the outer shell of the netting to facilitate thermal lamination of multiple layers of netting.

According to an exemplary embodiment of the present invention, extruded netted tubes are used in fabrics in the papermaking process to lower the material cost, improve productivity, and improve product quality. The positions where this type of fabric can have the most impact are as the forming fabrics of any paper machine or as the structuring fabric on Through Air Dried (creped or uncreped), ATMOS, NTT, QRT or ETAD tissue paper making machines.

The extruded netted tubes have openings that are square, diamond, circular, or any geometric shape that can be produced with the dye equipment used in the extrusion process. The netted tubes are composed of any combination of polymers necessary to develop the stretch, strength, heat resistance, and abrasion resistance necessary for the application. Additionally, coextrusion is preferred with an adhesive agent incorporated into the outer shell of the netting. The adhesive agent facilitates thermal lamination of multiple layers of netting, thermal lamination of netting to woven monofilaments, or thermal lamination of netting to woven monofilaments or multi-filamentous yarns needled with fine synthetic batt fibers. The netting is preferably stretched across a cylindrical mandrel to orient the polymers for increased strength and control over the size of the openings in the netting.

Netting that has been extruded in flat sheets and perforated with openings in the preferred geometric shapes can also be utilized. These nettings are preferably coextruded with an adhesive agent incorporated into the outer shell of the netting to facilitate thermal lamination of multiple layers of netting, thermal lamination of netting to woven monofilaments, or thermal lamination of netting to woven monofilaments or multi-filamentous yarns needled with fine synthetic batt fibers. The netting is preferable heated and stretched in the longitudinal and transverse direction to control the size of the opening and increase strength of the net. When flat netting is utilized, seaming is used to produce an endless tube. Seaming techniques using a laser or ultrasonic welding are preferred.

Figure 2:
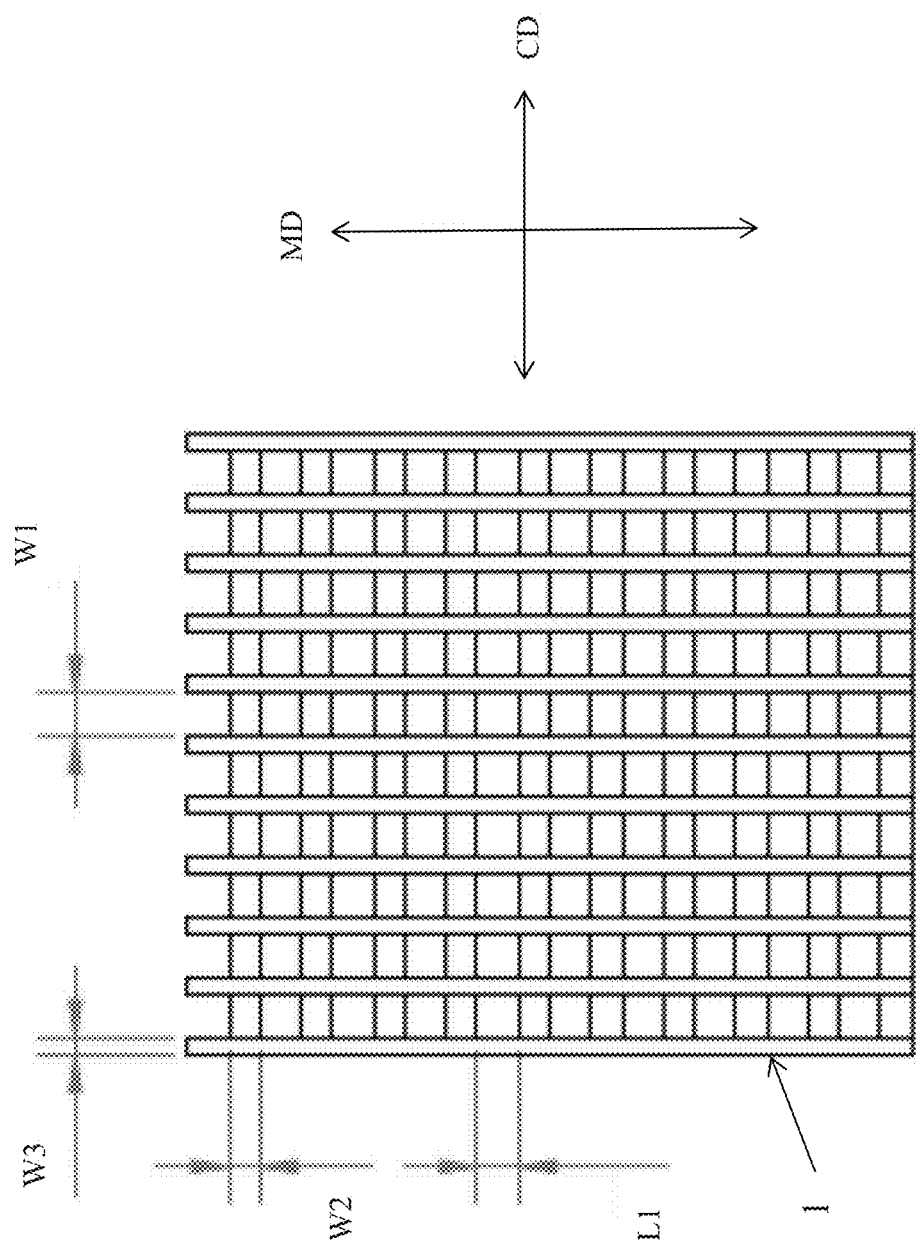
FIG. 2 is a top planar view of the fabric or belt of FIG. 1.

FIG. 1 is a cross-sectional view and FIG. 2 is a top planar view of a structuring belt or fabric, generally designated by reference number 1, according to an exemplary embodiment of the present invention. The belt or fabric 1 is multilayered and includes a layer 2 that forms the side of the belt or fabric carrying the paper web, and a woven fabric layer 4 forming the non-paper web contacting side of the belt or fabric. The layer 2 is comprised of netted tube of coextruded polymer with a thickness (T1) of 0.25 mm to 1.7 mm, with openings being regularly recurrent and distributed in the longitudinal (MD) and cross direction (CD) of the layer 2 or substantially parallel (plus or minus 10 degrees) thereto. The openings are square with a width (W1) and length (L1) between 0.25 to 1.0 mm or circular with a diameter between 0.25 to 1.0 mm. The MD aligned elements of the netting of the layer 2 extend (E1) 0.05 to 0.40 mm above the top plane of the CD aligned elements of the netting. The CD aligned elements of the netting of the structuring layer 2 have a thickness (T2.) of 0.34 mm. The widths (W3) of the MD aligned elements of the netting of the layer 2 are between 0.1 to 0.5 mm. The widths (W2) of the CD aligned elements are between 0.25 to 1.0 mm, as well. The two layers 2, 4 are laminated together using heat to melt the adhesive in the polymer of the layer 2. Ultrasonic, infrared, and laser welding can also be utilized to laminate the layers 2, 4. As discussed in further detail below, the lamination of the two layers results in the layer 2 extending only partially through the thickness of the woven fabric layer 4, with some portions of the layer 2 remaining unbonded to the woven fabric layer 4.

Figure 10:
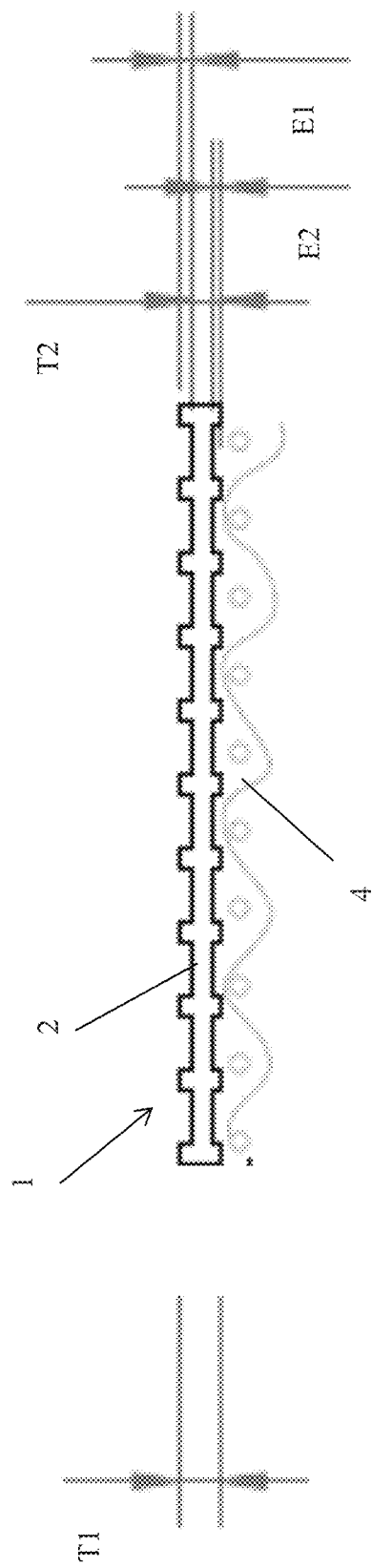
FIG. 10 is a cross-sectional view of a fabric or belt according to an exemplary embodiment of the present invention.

Optionally, as shown in FIG. 10, the MD aligned elements of the netting of the layer I can extend (E2) up to 0.40 mm below the bottom plane of the CD aligned portion of the netting to further aid in air flow in the X-Y plane of the fabric or belt and supported web. :In other embodiments, the elements described above as being MD and CD aligned elements may be aligned to the opposite axis or aligned off axis from the MD and/or CD directions.

The woven fabric layer 4 is comprised of a woven polymeric fabric with a preferred mesh of between 10-30 frames/cm, a count of 5 to 30 frames/cm, and a caliper from 0.5 mm to 1.5 mm. This layer preferably has a five shed non numerical consecutive warp-pick sequence (as described in U.S. Pat. No. 4,191,609) that is sanded to provide 20 to 50 percent contact area with the layer 2. The fabric or belt 1 with a woven fabric layer 4 of this design is suitable on any TAD or ATMOS asset. Optionally, the woven fabric layer 4 is composed of woven monofilaments or multi-filamentous yarns needled with fine synthetic batt fibers similar to a standard press fabric used in the conventional tissue papermaking press section. The fabric or belt 1 with a woven fabric layer 4 of this design is suitable on any NTT, QRT, or ETAD machine.

Figure 6:
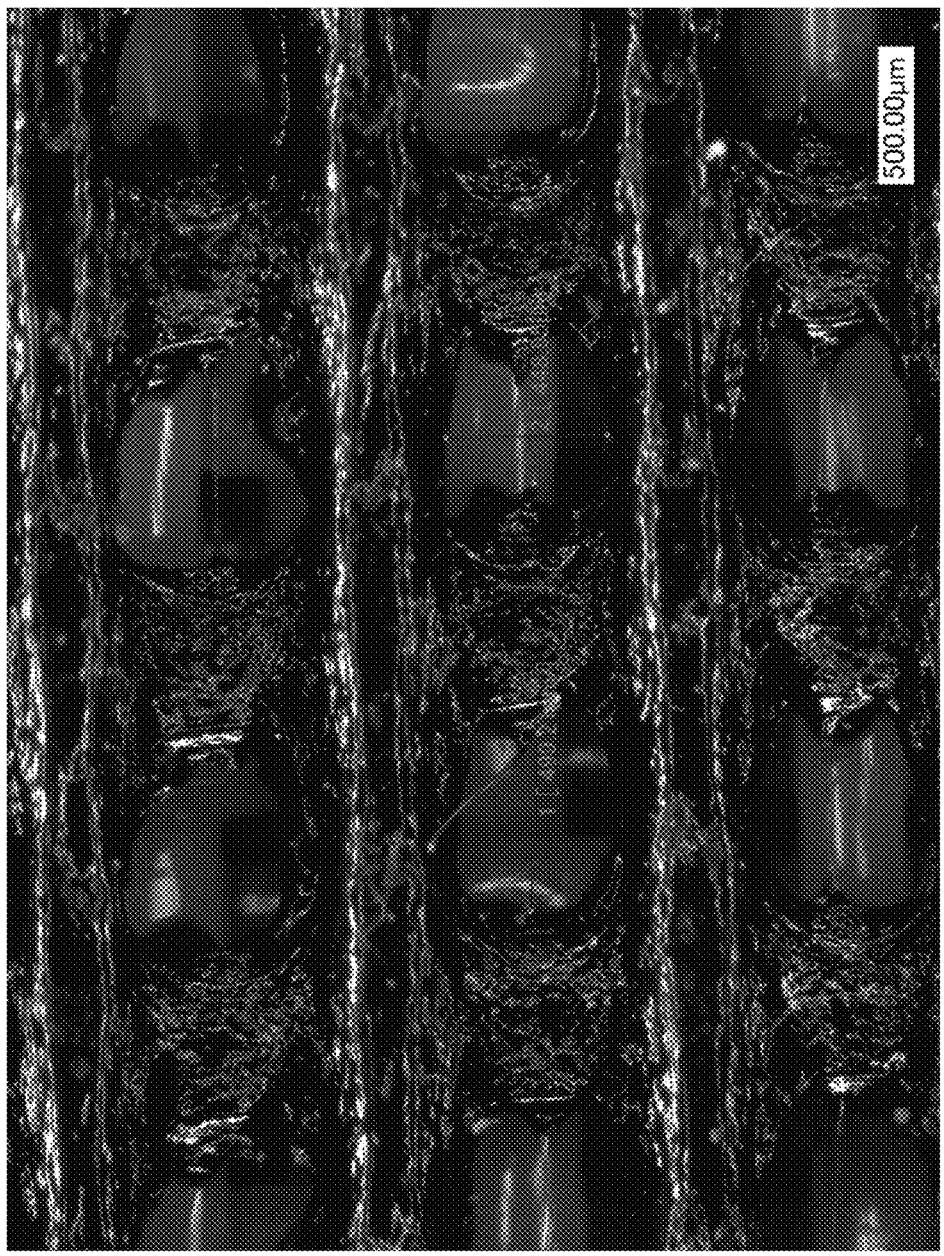
FIG. 6 is a photo showing a magnified image of a fabric or belt according to an exemplary embodiment of the present invention.
Figure 7:
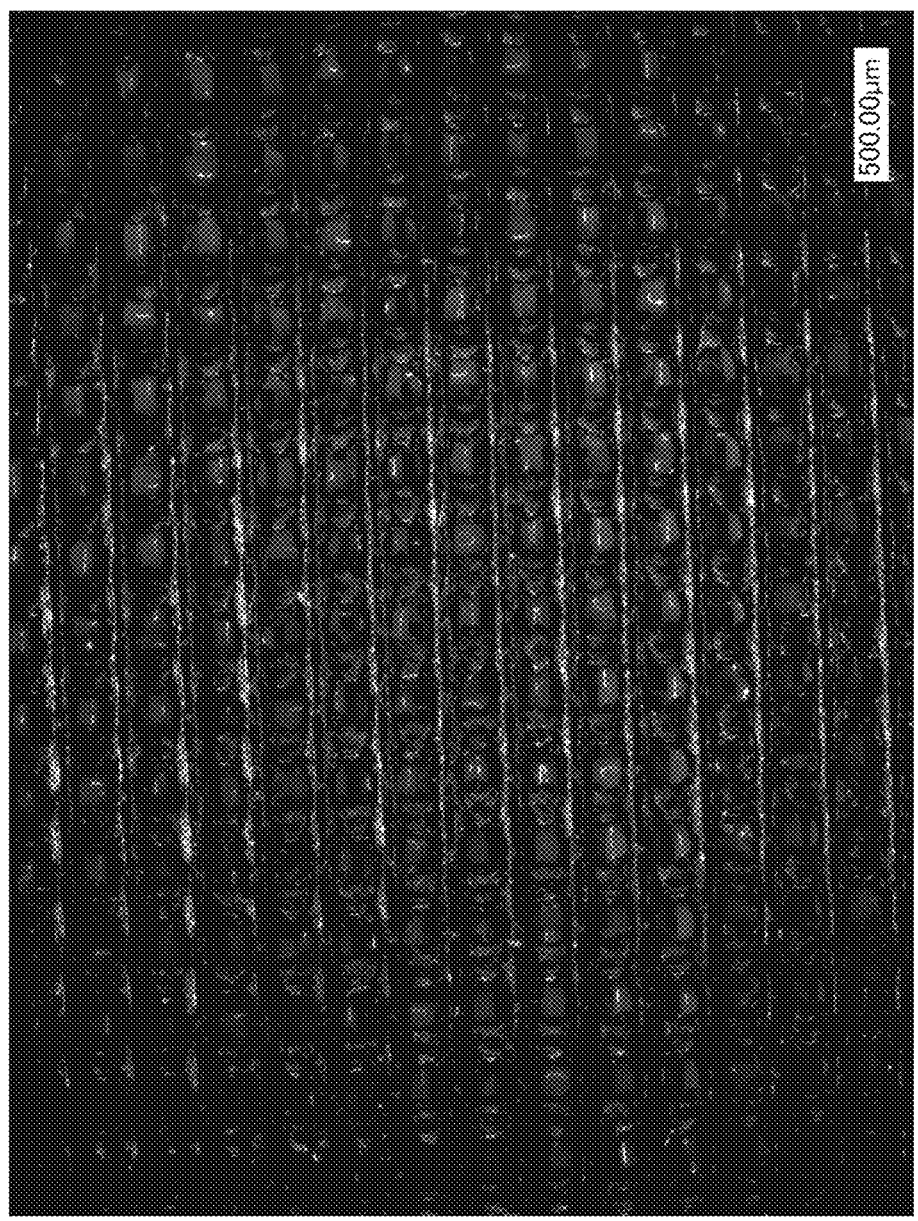
FIG. 7 is a photo of a fabric or belt according to an exemplary embodiment of the present invention.
Figure 8:
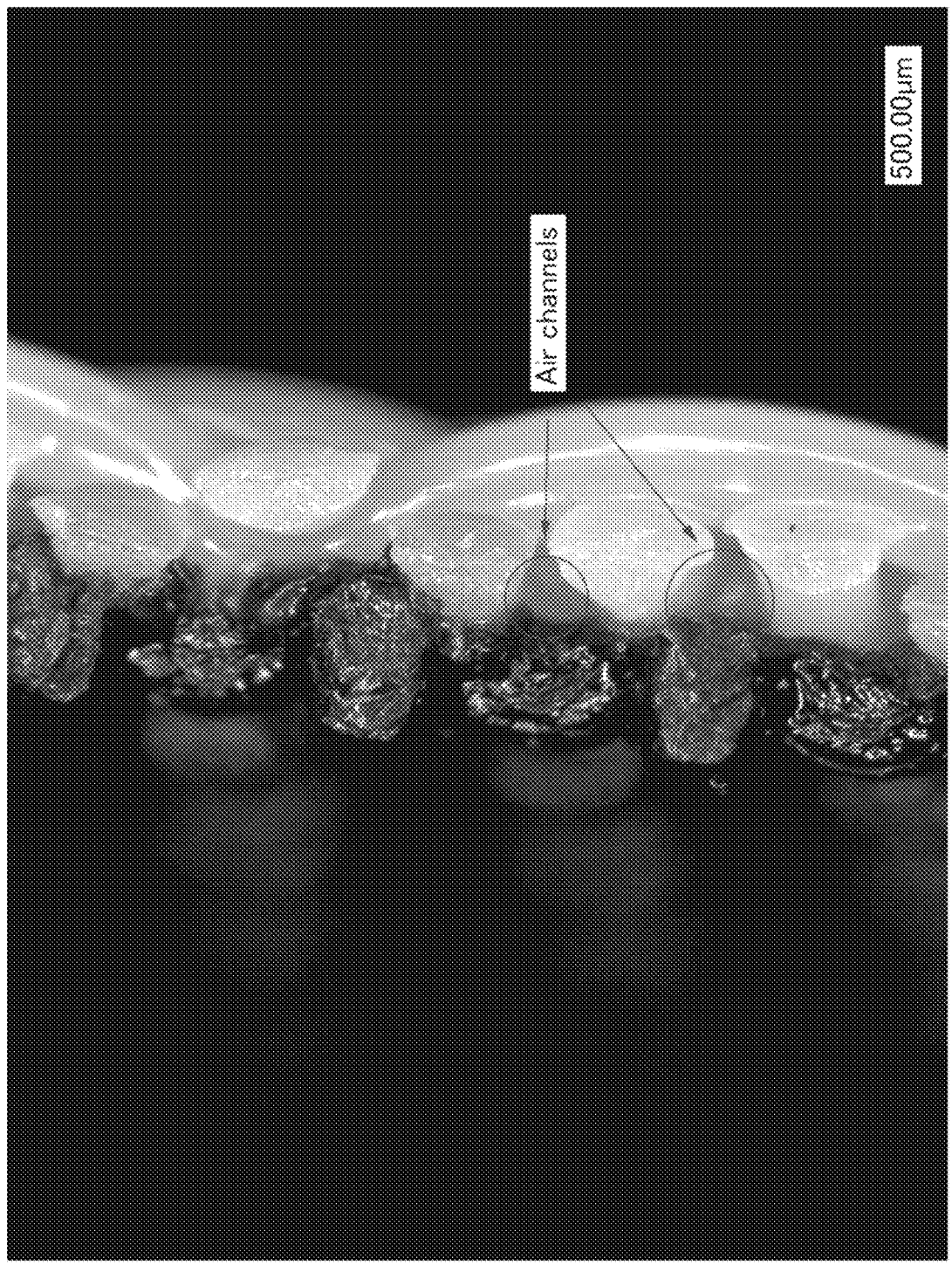
FIG. 8 is a photo showing air channels formed in the fabric or belt according to an exemplary embodiment of the present invention.
Figure 9:
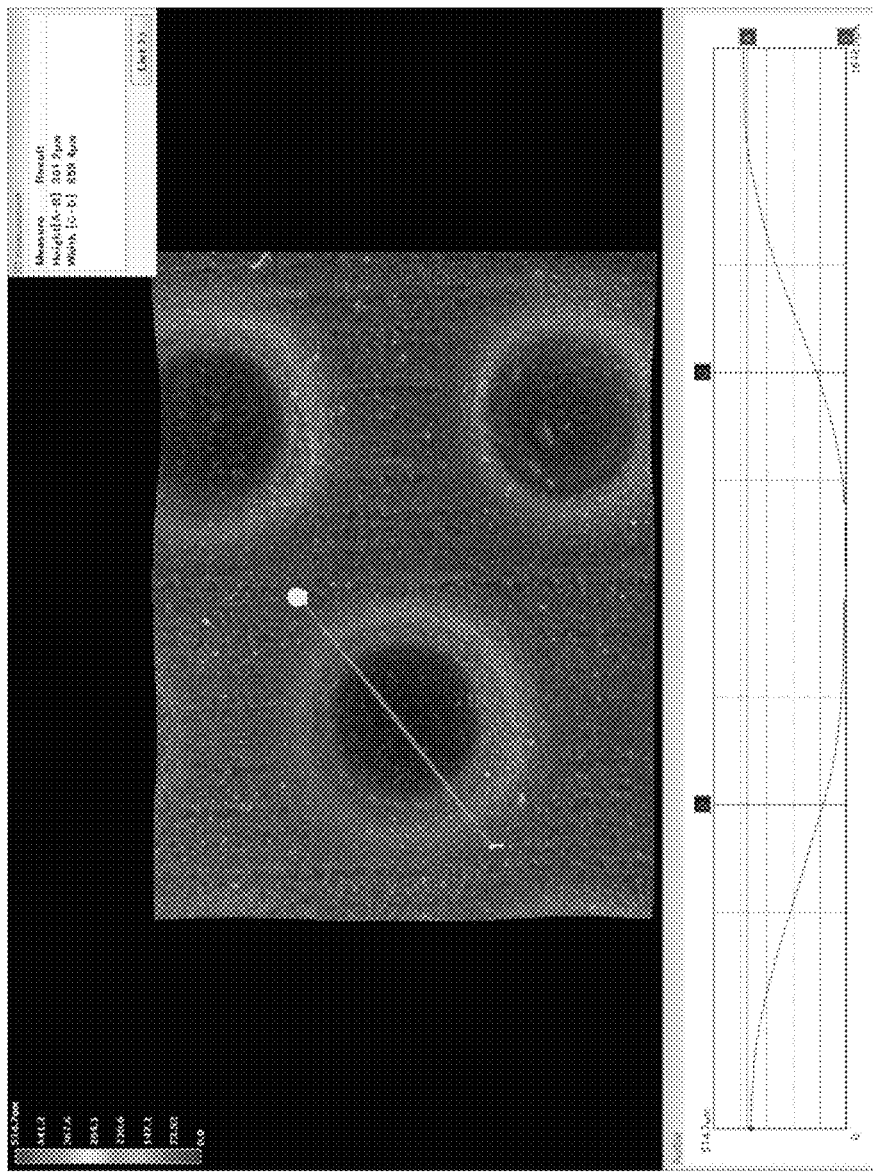
FIG. 9 is a photo of a welded polymer structuring layer according to the conventional art.
Figure 11:
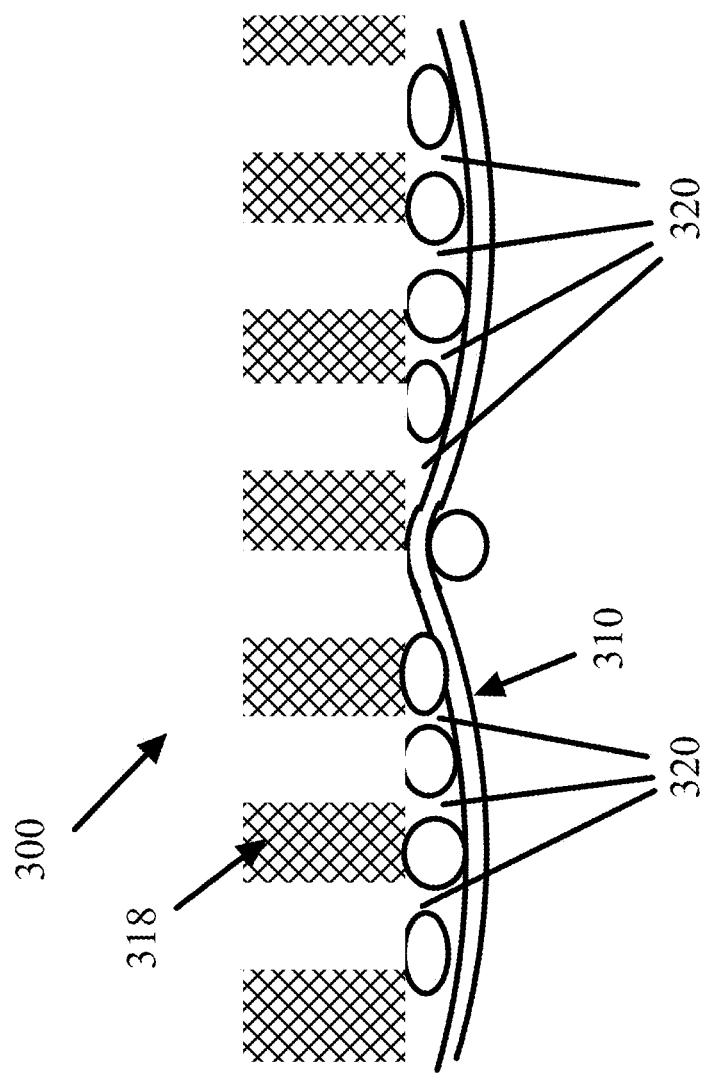
FIG. 11 is a cross-sectional view of a fabric or belt according to an exemplary embodiment of the present invention.
Figure 12:
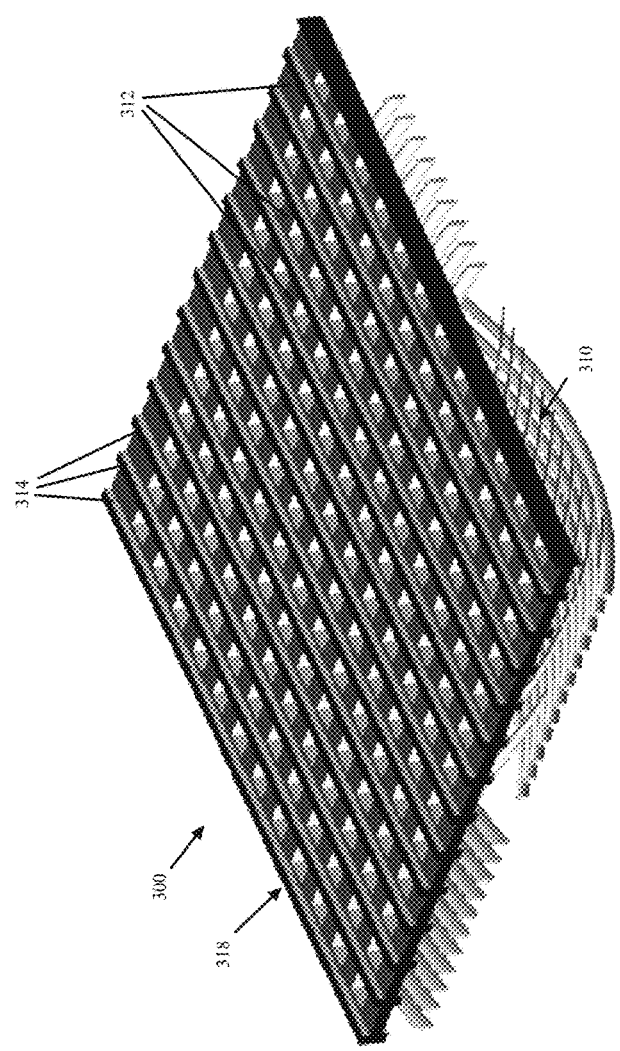
FIG. 12 is a sectional perspective view of a fabric or belt according to an exemplary embodiment of the present invention.

FIGS. 6-8 are photographs, FIG. 11 is a cross-sectional view and FIG. 12 is a perspective view of a belt or fabric, generally designated by reference number 300, according to an exemplary embodiment of the present invention. The belt or fabric 300 is produced by laminating an already cured polymer netted layer 318 to a woven fabric layer 310. The polymer netted layer 318 includes CD aligned elements 314 and MD aligned elements 312. The CD aligned elements 314 and the MD aligned elements 312 cross one another with spaces between adjacent elements so as to form openings. As best shown in the photographs of FIGS. 6-8, both the extruded polymer netting layer 318 and woven layer 310 have non-planar, irregularly shaped surfaces that when laminated together only bond together where the two layers come into direct contact. The lamination results in the extruded polymer layer 318 extending only partially into the woven layer 310 so that any bonding that takes place between the two layers occurs at or near the surface of the woven layer 310. In a preferred embodiment, the extruded polymer layer 318 extends into the woven layer 310 to a depth of 30 microns or less. As shown in FIG. 11, the partial and uneven bonding between the two layers results in formation of air channels 320 that extend in the X-Y plane of the fabric or belt 300. This in turn allows air to travel in the X-Y plane along a sheet (as well as within the fabric or belt 300) being held by the fabric or belt 300 during TAD, UCTAD, or ATMOS processes. Without being bound by theory, it is believed that the fabric or belt 300 removes higher amounts of water due to the longer airflow path and dwell time as compared to conventional designs. In particular, previously known woven and overlaid fabric designs create channels where airflow is restricted in movement in regards to the X-Y direction and channeled in the Z-direction by the physical restrictions imposed by pockets formed by the monofilaments or polymers of the belt. The inventive design allows for airflow in the X-Y direction, such that air can move parallel through the belt and web across multiple pocket boundaries and increase contact time of the airflow within the web to remove additional water. This allows for the use of belts with lower permeability compared to conventional fabrics without increasing the energy demand per ton of paper dried. The air flow in the X-Y plane also reduces high velocity air flow in the Z-direction as the sheet and fabric pass across the molding box, thereby reducing the formation of pin holes in the sheet.

In an exemplary embodiment, the woven layer 310 is composed of polyethylene terephthalate (PET). Conventional non-overlaid structuring fabrics made of PET typically have a failure mode in which fibrillation of the sheet side of the monofilaments occurs due to high pressure from cleaning showers, compression at the pressure roll nip, and heat from the TAD, UCTAD, or ATMOS module. The non-sheet side typically experiences some mild wear and loss of caliper due to abrasion across the paper machine rolls and is rarely the cause of fabric failure. By contrast, the extruded polymer layer 318 is composed of polyurethane, which has higher impact resistance as compared to PET to better resist damage by high pressure showers. It also has higher load capacity in both tension and compression such that it can undergo a change in shape under a heavy load but return to its original shape once the load is removed (which occurs in the pressure roll nip). Polyurethane also has excellent flex fatigue resistance, tensile strength, tear strength, abrasion resistance, and heat resistance. These properties allow the fabric to be durable and run longer on the paper machine than a standard woven fabric. Additionally the woven structure can be sanded to increase the surface area that contacts the extruded polymer layer to increase the total bonded area between the two layers. Varying the degree of sanding of the woven structure can alter the bonded area from 10% to up to 50% of the total surface area of the woven fabric that lies beneath the extruded polymer layer. The preferred bonded area is approximately 20-30% which provides sufficient durability to the fabric without closing excessive amounts of air channels in the X-Y plane of the fabric, which in turn maintains improved drying efficiency compared to conventional fabrics.

Figure 3:
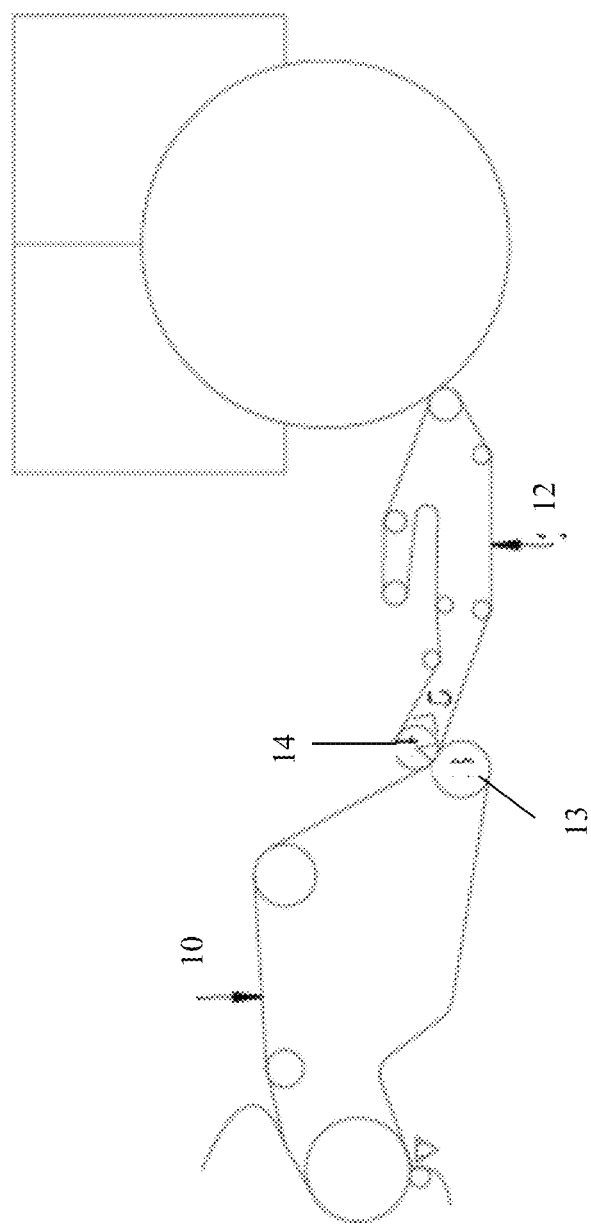
FIG. 3 is a block diagram of a press section according to an exemplary embodiment of the present invention.

FIG. 3 shows a press section according to an exemplary embodiment of the present invention. The press section is similar to the press section described in US Patent Application Publication No. 2011/0180223 except the press is comprised of suction pressure roll 14 and an extended nip or shoe press 13. A paper web, supported upon a press fabric 10 composed of woven monofilaments or multi-filamentous yarns needled with fine synthetic batt fibers, is transported through this press section nip and transferred to the structuring belt 12. The structuring belt 12 is comprised of a structuring layer of extruded netting or welded polymeric strips made permeable with holes formed by laser drilling (or other suitable mechanical processes) and laminated to a support layer comprised of woven monofilaments or multi-filamentous yarns needled with fine synthetic batt fibers. The support layer is preferably comprised of a material typical of a press fabric used on a conventional tissue machine. The paper web is dewatered through both sides of the sheet into the press fabric 10 and structuring fabric 12 as the web passes through the nip of the press section. The suction pressure roll 14 is preferably a through drilled, blind drilled, and/or grooved polyurethane covered roll.

This press section improves the softness, bulk, and absorbency of web compared to the NTT process. The NTT process flattens the web inside the pocket of the fabric since all the force is being applied by the shoe press to push the web into a fabric pocket that is impermeable or of extremely low permeability to build up hydraulic force to remove the water. The inventive press section uses a press to push the web into a permeable fabric pocket while also drawing the sheet into the fabric pocket using vacuum. This reduces the necessary loading force needed by the shoe press and reduces the buildup of hydraulic pressure, both of which would compress the sheet. The result is that the web within the fabric pocket remains thicker and less compressed, giving the web increased bulk, increased void volume and absorbency, and increased bulk softness. The press section still retains the simplicity, high speed operation, and low energy cost platform of the NTT, but improves the quality of the product.

Figure 4:
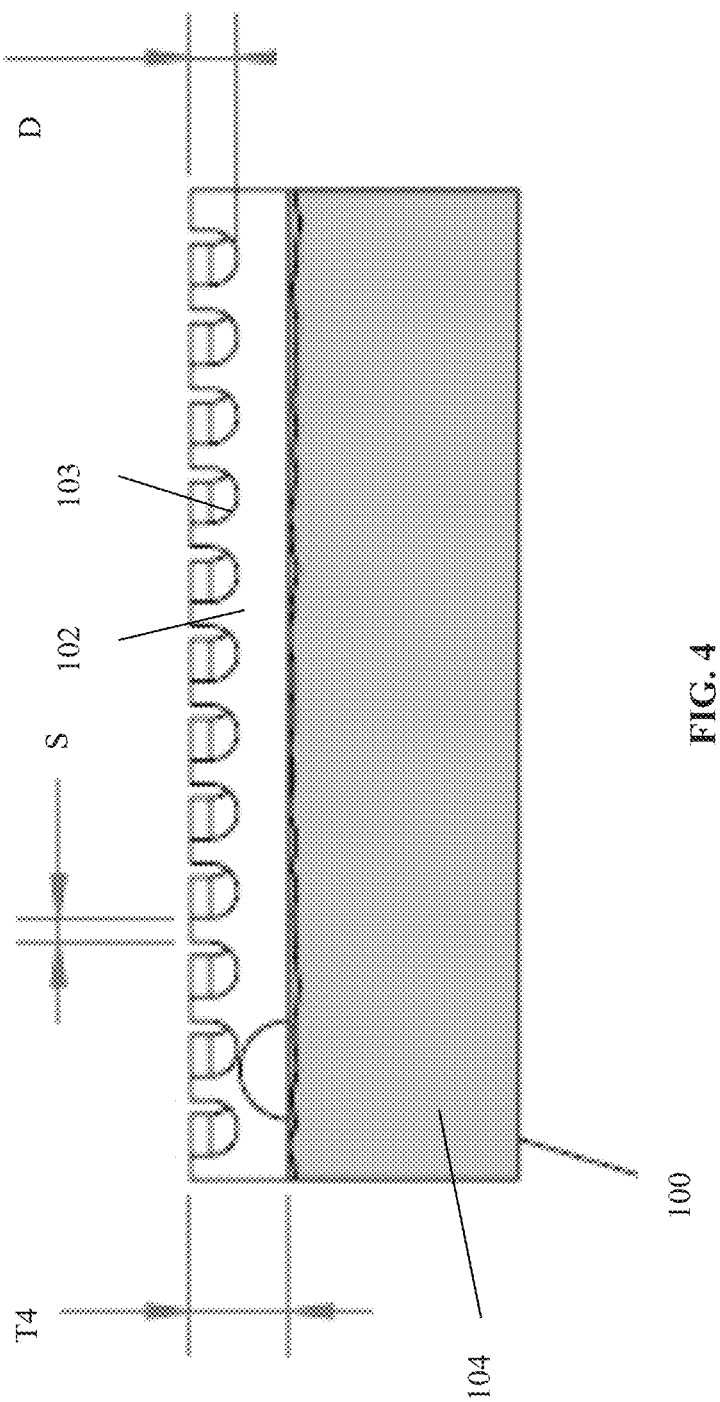
FIG. 4 is a cross-sectional view of a fabric or belt according to an exemplary embodiment of the present invention.
Figure 5:
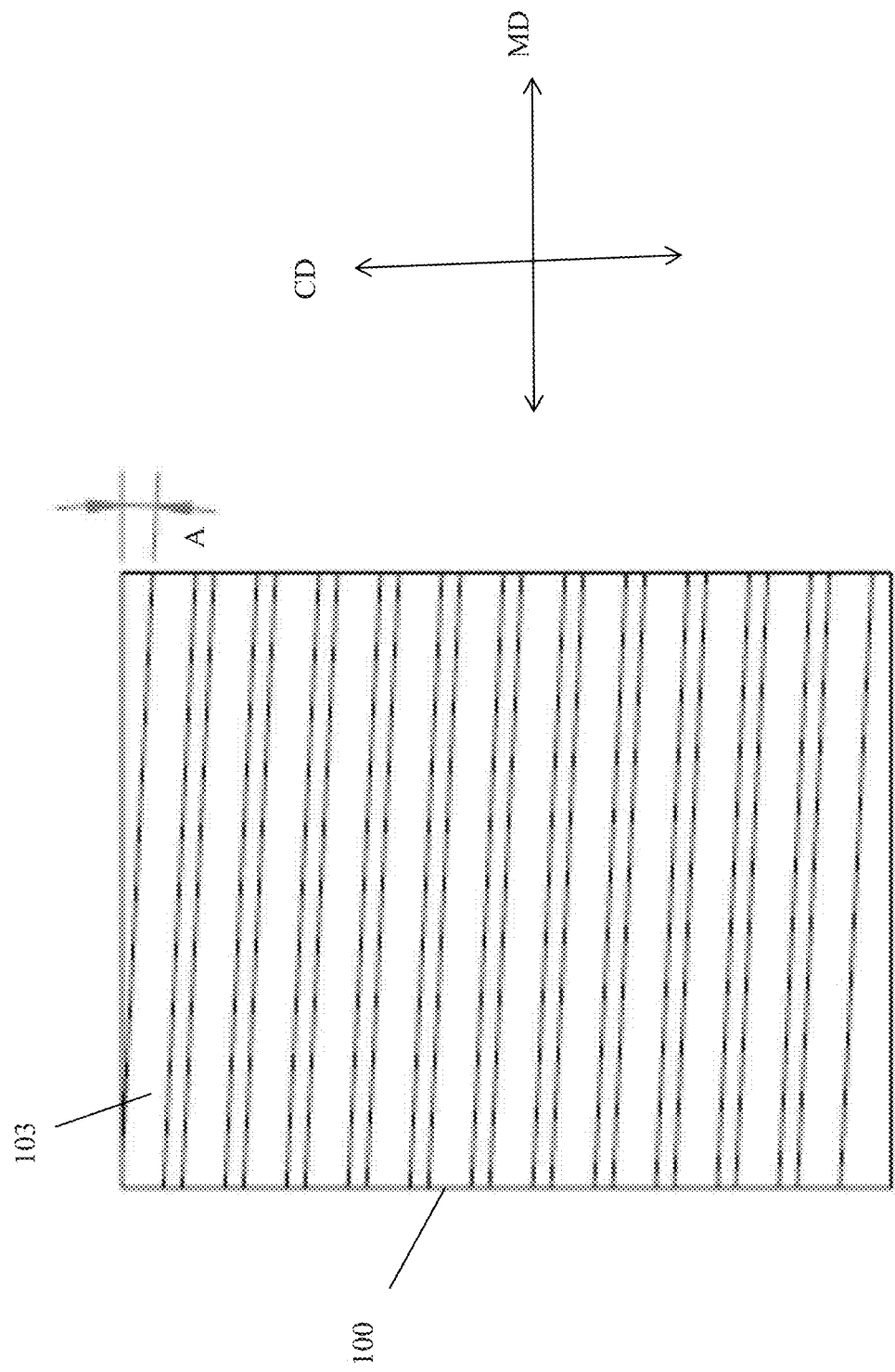
FIG. 5 is a planar view of the fabric of belt of FIG. 4.

FIG. 4 is a cross-sectional view and FIG. 5 is a top planar view of a structuring belt or fabric, generally designated by reference number 100, according to another exemplary embodiment of the present invention. The belt or fabric 100 is multilayered and includes a layer 102 that forms the side of the belt or fabric carrying the paper web, and a woven fabric layer 104 forming the non-paper web contacting side of the belt or fabric. The layer 102 is made of a polymeric material and, in an exemplary embodiment, the layer 102 is made of a sheet of extruded polymeric material. Grooves 103 are formed in the layer 102 (for example, by laser drilling) that extend at an angle (A) relative to the machine direction, and in embodiments the grooves 103 are angled 0.1% to 45% relative to the machine direction, preferably 0.1% to 5% relative to the machine direction, and more preferably 2% to 3% relative to the machine direction. The grooves 103 have a depth (D) of 0.25 mm to 1.0 mm, preferably 0.4 mm to 0.75 mm, and more preferably 0.4 mm to 0.6 mm. The grooves 103 have a square, semicircular or tapered profile, and are spaced 0.1 mm to 1.5 mm apart (S), preferably 0.2 mm to 0.5 mm apart, and more preferably 0.2 mm to 0.3 mm apart. The layer 102 has a thickness (T4) of 0.25 mm to 1.5 mm, preferably 0.5 mm to 1.0 mm, and more preferably 0.75 mm to 1.0 mm. The fabric or belt 100 is subjected to punching, drilling or laser drilling to achieve an air permeability of 20 cfm to 200 cfm, preferably 20 cfm to 100 cfm, and more preferably 10 cfm to 50 cfm.

In a variation of the exemplary embodiment shown in FIG. 4, additional grooves are formed in the layer 102 which extend in the cross direction. Portions of the layer 102 between the cross direction grooves are lower than portions between the machine direction grooves, so that the portions between the machine direction grooves form elevated elements in the surface of the layer 102 in contact with the web, similar to the embodiment shown in FIG. 1.

The following example and test results demonstrate the advantages of the present invention.

Softness Testing

Softness of a 1-ply tissue web was determined using a Tissue Softness Analyzer (TSA), available from EMTECH Electronic GmbH of Leipzig, Germany. A punch was used to cut out three 100 cm$^2$ round samples from the web. One of the samples was loaded into the TSA, clamped into place, and the Tissue Basesheet II algorithm was selected from the list of available softness testing algorithms displayed by the TSA. After inputting parameters for the sample, the TSA measurement program was run. The test process was repeated for the remaining samples and the results for all the samples were averaged.

Stretch & MD, CD, and Wet CD Tensile Strength Testing

An Instron 3343 tensile tester, manufactured by Instron of Norwood, Mass., with a 100N load cell and 25.4 mm rubber coated jaw faces was used for tensile strength measurement. Prior to measurement, the Instron 3343 tensile tester was calibrated. After calibration, 8 strips of 1-ply product, each one inch by four inches, were provided as samples for each test. The strips were cut in the MD direction when testing MD and in the CD direction when testing CD. One of the sample strips was placed in between the upper jaw faces and clamp, and then between the lower jaw faces and clamp with a gap of 2 inches between the clamps. A test was run on the sample strip to obtain tensile and stretch. The test procedure was repeated until all the samples were tested. The values obtained for the eight sample strips were averaged to determine the tensile strength of the tissue.

Basis Weight

Using a dye and press, six 76.2 mm by 76.2 mm square samples were cut from a 1-ply product being careful to avoid any web perforations. The samples were placed in an oven at 105 deg C. for 5 minutes before being weighed on an analytical balance to the fourth decimal point. The weight of the sample in grams was divided by $(0.0762\ m)^2$ to determine the basis weight in grams/$m^2$.

Caliper Testing

A Thwing-Albert ProGage 100 Thickness Tester, manufactured by Thwing Albert of West Berlin, N.J. was used for the caliper test. Eight 100 mm×100 mm square samples were cut from a 1-ply product. The samples were then tested individually and the results were averaged to obtain a caliper result for the base sheet.

Example 1

A 1-ply creped tissue web was produced on a Through Air Dried paper machine with a triple layer headbox and dual TAD drums, with the tissue web having the following product attributes: Basis Weight 20.8 g/$m^2$, Caliper 0.305 mm, MD tensile of 69.7 N/m, CD tensile of 43.7 N/m, an MD stretch of 22.4%, a CD stretch of 8.5%, and a 96 TSA.

The tissue web was multilayered with the fiber and chemistry of each layer selected and prepared individually to maximize product quality attributes of softness and strength. The first exterior layer, which was the layer that contacted the Yankee dryer, was prepared using 100% eucalyptus with 0.25 kg/ton of a synthetic polymer dry strength agent DPD-589 (Ashland, 500 Hercules Road, Wilmington Del., 19808). The interior layer was composed of 40% northern bleached softwood kraft fibers, 60% eucalyptus fibers, and 0.75 kg/ton of T526, a softener/debonder (EKA Chemicals Inc., 1775 West Oak Commons Court, Marietta, Ga., 30062). The second exterior layer was composed of 40% northern bleached softwood kraft fibers, 60% eucalyptus fibers and with 1.875 kg/ton of a synthetic polymer dry strength agent DPD-589 at 3.0 kg/ton. The softwood was refined at 30 kwh/ton to impart the necessary tensile strength.

The fiber and chemicals mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 1060 m/min. The slurry was drained through the outer wire, which was a KT194-P design supplied by Asten Johnson (4399 Corporate Rd, Charleston, S.C.), to aid with drainage, fiber support, and web formation. When the fabrics separated, the web followed the inner forming wire and was dried to approximately 27% solids using a series of vacuum boxes and a steam box.

The web was then transferred to a structuring fabric running at 1060 m/min with the aid of a vacuum box to facilitate fiber penetration into the structuring fabric to enhance bulk softness and web imprinting. The structuring fabric included a layer made from a netted tube of extruded polymer with a thickness of 0.5 mm, as shown in FIG. 1, with openings being regularly recurrent and distributed in the longitudinal (MD) and cross direction (CD). This layer was the structuring layer of the fabric. The openings were circular with a diameter of 0.63 mm. The MD aligned portion of the netting of the layer extended 0.16 mm above the top plane of the CD aligned portion of the netting of the layer. The width of the MD aligned portion of the netting of the layer was 0.26 mm. The width of the CD aligned portion of the netting of the layer was 0.46 mm. The layer was supported by woven fabric layer, which was a Prolux N005, 5 shed 1,3,5,2,4 warp pick sequence woven polymer fabric sanded to 27% contact area, supplied by Albany (216 Airport Drive Rochester, N.H., USA) with a caliper of 0.775 mm. The two layers were laminated together using ultrasonic welding.

The web was dried with the aid of two TAD hot air impingement drums to 81% moisture before transfer to the Yankee dryer. The web was held in intimate contact with the Yankee surface using an adhesive coating chemistry. The Yankee dryer was provided steam at 300 kPa while the installed hot air impingement hood over the Yankee dryer blew heated air at 125 deg C. The web was creped from the Yankee dryer at 13.2% crepe at 98.2% dryness using a steel blade at a pocket angle of 90 degrees.

Example 2

A 1-ply creped tissue web was produced on a Through Air Dried paper machine with a triple layer headbox and dual TAD drums, with the tissue web having the following product attributes: Basis Weight 20.6 g/$m^2$, Caliper 0.380 mm, MD tensile of 68.8 N/m, CD tensile of 37.9 N/m, an MD stretch of 21.1%, a CD stretch of 10.8%, and a 97.1 TSA.

The tissue web was multilayered with the fiber and chemistry of each layer selected and prepared individually to maximize product quality attributes of softness and strength. The first exterior layer, which was the layer that contacted the Yankee dryer, was prepared using 75% eucalyptus and 25% northern bleached softwood kraft fibers with 1.25 kg/ton of glyoxylated polyacrylamide, Hercobond 1194 and 0.25 kg/ton of a polyvinylamine retention aid, Hercobond 6950 (Solenis, 500 Hercules Road, Wilmington Del., 19808) and 0.75 kg/ton of Redibond 2038 (Ingredion 5 Westbrook Corporate Center Westchester, Ill. 60154). The interior layer was composed of 25% northern bleached softwood kraft fibers, 75% eucalyptus fibers, and 0.75 kg/ton of T526, a softener/debonder (EKA Chemicals Inc., 1775 West Oak Commons Court, Marietta, Ga., 30062) and 1.25 kg/ton of Hercobond 1194. The second exterior layer was composed of 100% northern bleached softwood kraft fibers with 2.25 kg/ton of Redibond 2038 and 0.25 kg/ton of Hercobond 6950. The softwood was refined at 13 kwh/ton to impart the necessary tensile strength.

The fiber and chemicals mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 1060 m/min. The slurry was drained through the outer wire, which was a KT194-P design supplied by Asten Johnson (4399 Corporate Rd, Charleston, S.C.), to aid with drainage, fiber support, and web formation. When the fabrics separated, the web followed the inner forming wire and was dried to approximately 27% solids using a series of vacuum boxes and a steam box.

The web was then transferred to a structuring fabric running at 1060 m/min with the aid of a vacuum box to facilitate fiber penetration into the structuring fabric to enhance bulk softness and web imprinting. The structuring fabric included a layer made from a netted tube of extruded polymer with a thickness of 0.7 mm, as shown in FIG. 1, with openings being regularly recurrent and distributed in the longitudinal (MD) and cross direction (CD). This layer was the structuring layer of the fabric. The openings were circular with a diameter of 0.75 mm. The MD aligned portion of the netting of the layer extended 0.25 mm above the top plane of the CD aligned portion of the netting of the layer. The width of the MD aligned portion of the netting of the layer was 0.52 mm. The width of the CD aligned portion of the netting of the layer was 0.62 mm. The layer was supported by woven fabric layer, which was a Prolux N005, 5 shed 1,3,5,2,4 warp pick sequence woven polymer fabric sanded to 27% contact area, supplied by Albany (216 Airport Drive Rochester, N.H., USA) with a caliper of 0.775 mm. The two layers were laminated together using ultrasonic welding.

The web was dried with the aid of two TAD hot air impingement drums to approximately 80% moisture before transfer to the Yankee dryer. The web was held in intimate contact with the Yankee surface using an adhesive coating chemistry. The Yankee dryer was provided steam at 300 kPa while the installed hot air impingement hood over the Yankee dryer blew heated air at 105 deg C. The web was creped from the Yankee dryer at 13% crepe at approximately 98% dryness using a steel blade at a pocket angle of 90 degrees.

Comparative Example

A 1-ply creped tissue web was produced on a Through Air Dried paper machine with a triple layer headbox and dual TAD drums, with the tissue web having the following product attributes: Basis Weight 20.4 g/m 2, Caliper 0.336 mm, MD tensile of 76.3 N/m, CD tensile of 40.6 N/m, an MD stretch of 22.9%, a CD stretch of 10.1%, and a 90.9 TSA.

The tissue web was multilayered with the fiber and chemistry of each layer selected and prepared individually to maximize product quality attributes of softness and strength. The first exterior layer, which was the layer that contacted the Yankee dryer, was prepared using 75% eucalyptus and 25% northern bleached softwood kraft fibers with 1.25 kg/ton of glyoxylated polyacrylamide, Hercobond 1194 and 0.25 kg/ton of a polyvinylamine retention aid, Hercobond 6950 (Solenis, 500 Hercules Road, Wilmington Del., 19808) and 1.25 kg/ton of Redibond 2038 (Ingredion 5 Westbrook Corporate Center Westchester, Ill. 60154). The interior layer was composed of 25% northern bleached softwood kraft fibers, 75% eucalyptus fibers, and 0.75 kg/ton of T526, a softener/debonder (EKA Chemicals Inc., 1775 West Oak Commons Court, Marietta, Ga., 30062) and 1.25 kg/ton of Hercobond 1194. The second exterior layer was composed of 100% northern bleached softwood kraft fibers with 3.75 kg/ton of Redibond 2038 and 0.25 kg/ton of Hercobond 6950. Softwood was refined at 16 kwh/ton to impart the necessary tensile strength.

The fiber and chemicals mixtures were diluted to a solids of 0.5% consistency and fed to separate fan pumps which delivered the slurry to a triple layered headbox. The headbox pH was controlled to 7.0 by addition of sodium bicarbonate to the thick stock before the fan pumps. The headbox deposited the slurry to a nip formed by a forming roll, an outer forming wire, and inner forming wire where the wires were running at a speed of 1060 m/min. The slurry was drained through the outer wire, which was a KT194-P design supplied by Asten Johnson (4399 Corporate Rd, Charleston, S.C.), to aid with drainage, fiber support, and web formation. When the fabrics separated, the web followed the inner forming wire and was dried to approximately 27% solids using a series of vacuum boxes and a steam box.

The web was then transferred to a structuring fabric running at 1060 m/min with the aid of a vacuum box to facilitate fiber penetration into the structuring fabric to enhance bulk softness and web imprinting. The structured fabric was a Prolux 005 design supplied by Albany (216 Airport Drive Rochester, N.H. 03867 USA) and was a 5 shed design with a warp pick sequence of 1,3,5,2,4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer.

The web was dried with the aid of two TAD hot air impingement drums to approximately 80% moisture before transfer to the Yankee dryer. The web was held in intimate contact with the Yankee surface using an adhesive coating chemistry. The Yankee dryer was provided steam at 300 kPa while the installed hot air impingement hood over the Yankee dryer blew heated air at 110 deg C. The web was creped from the Yankee dryer at 13.0% crepe at approximately 98% dryness using a steel blade at a pocket angle of 90 degrees.

A comparison of Example 2 with the Comparative Example demonstrates that the use of an overlaid fabric of the present invention allows for use of a lower temperature through the TAD section to arrive at the same sheet dryness. Example 1 differs from Example 2 and the Comparative Example in that Example 1 used less hardwood. The furnish mixtures were the same between Example 2 and the Comparative Example and the basis weight and quality of the sheet were also very similar.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:
1. A fabric or belt for a papermaking machine comprising:
 a first layer that defines a web contacting surface, the first layer being made of extruded polymer and comprising:
  a plurality of first elements aligned in a first direction;
  a plurality of second elements aligned in a second direction and extending over the plurality of first elements; and
  a plurality of open portions defined by the plurality of first and second elements; and
 a second layer made of woven fabric that supports the first layer,
 wherein the first layer is bonded to the second layer so that the first layer extends only partially through the second layer and an interface formed between the first and second layers comprises airflow channels that extend in both a machine direction and a cross direction within a plane parallel to the first and second layers, and wherein the fabric or belt is a structuring fabric configured for use on a papermaking machine.

2. The fabric or belt of claim 1, wherein the interface between the first and second layers comprises bonded and non-bonded portions.

3. The fabric or belt of claim 1, wherein the first layer extends into the second layer by an amount of 30 µm or less.

4. The fabric or belt of claim 1, wherein the first layer has a thickness of 0.25 mm to 1.7 mm.

5. The fabric or belt of claim 1, wherein the first layer has a thickness of 0.4 mm to 0.75 mm.

6. The fabric or belt of claim 1, wherein the first layer has a thickness of 0.5 mm to 0.6 mm.

7. The fabric or belt of claim 1, wherein the plurality of open portions repeat across the first layer in both machine and cross directions at regular intervals.

8. The fabric or belt of claim 1, wherein the plurality of open portions are rectangular-shaped open portions.

9. The fabric or belt of claim 8, wherein the rectangular-shaped open portions are defined by sides with a length of 0.25 mm to 1.0 mm.

10. The fabric or belt of claim 8, wherein the rectangular-shaped open portions are defined by sides with a length of 0.4 mm to 0.75 mm.

11. The fabric or belt of claim 8, wherein the rectangular-shaped open portions are defined by sides with a length of 0.5 mm to 0.7 mm.

12. The fabric or belt of claim 8, wherein the plurality of open portions are square-shaped open portions.

13. The fabric or belt of claim 1, wherein the plurality of open portions are circular-shaped open portions.

14. The fabric or belt of claim 13, wherein the diameter of the circular-shaped open portions is 0.25 mm to 1.0 mm.

15. The fabric or belt of claim 13, wherein the diameter of the circular-shaped open portions is 0.4 mm to 0.75 mm.

16. The fabric or belt of claim 13, wherein the diameter of the circular-shaped open portions is 0.1 mm to 0.7 mm.

17. The fabric or belt of claim 1, wherein the plurality of second elements extend above the plurality of first elements by an amount of 0.05 mm to 0.40 mm.

18. The fabric or belt of claim 1, wherein the plurality of second elements extend above the plurality of first elements by an amount of 0.1 mm to 0.3 mm.

19. The fabric or belt of claim 1, wherein the plurality of second elements extend above the plurality of first elements by an amount of 0.1 mm to 0.2 mm.

20. The fabric or belt of claim 1, wherein the plurality of second elements have a width of 0.1 mm to 0.7 mm.

21. The fabric or belt of claim 1, wherein the plurality of second elements have a width of 0.2 mm to 0.4 mm.

22. The fabric or belt of claim 1, wherein the plurality of second elements have a width of 0.25 mm to 0.3 mm.

23. The fabric or belt of claim 1, wherein the plurality of first elements have a thickness of 0.15 mm to 0.75 mm.

24. The fabric or belt of claim 1, wherein the plurality of first elements have a thickness of 0.3 mm to 0.6 mm.

25. The fabric or belt of claim 1, wherein the plurality of first elements have a thickness of 0.4 mm to 0.6 mm.

26. The fabric or belt of claim 1, wherein the plurality of first elements have a width of 0.25 mm to 1.0 mm.

27. The fabric or belt of claim 1, wherein the plurality of first elements have a width of 0.3 mm to 0.5 mm.

28. The fabric or belt of claim 1, wherein the plurality of first elements have a width of 0.4 mm to 0.5 mm.

29. The fabric or belt of claim 1, wherein the first layer is made of polymer or copolymer.

30. The fabric or belt of claim 29, wherein the first layer is made of an extruded netting tube.

31. The fabric or belt of claim 30, wherein the extruded netting tube is stretched to orient the polymer or copolymer.

32. The fabric or belt of claim 29, wherein the first layer is made of a perforated sheet.

33. The fabric or belt of claim 32 wherein the perforated sheet is stretched to orient the polymer or copolymer.

34. The fabric or belt of claim 32, wherein the perforated sheet is seamed using thermal, laser, infrared or ultraviolet seaming.

35. The fabric or belt of claim 1, wherein the second layer comprises woven polymeric monofilaments.

36. The fabric or belt of claim 1, wherein the second layer comprises woven monofilaments or multi-filamentous yarns needled with fine synthetic bad fibers.

37. The fabric or belt of claim 1, wherein the second layer has a 5 shed weave with a non-numerical warp pick sequence.

38. The fabric or belt of claim 1, wherein the second layer has a mesh of 10 to 30 frames/cm.

39. The fabric or belt of claim 1, wherein the second layer has a mesh of 15 to 25 frames/cm.

40. The fabric or belt of claim 1, wherein the second layer has a mesh of 17 to 22 frames/cm.

41. The fabric or belt of claim 1, wherein the second layer has a count of 5 to 30 frames/cm.

42. The fabric or belt of claim 1, wherein the second layer has a count of 10 to 20 frames/cm.

43. The fabric or belt of claim 1, wherein the second layer has a count of 15 to 20 frames/cm.

44. The fabric or belt of claim 1, wherein the second layer has a caliper of 0.5 mm to 1.5 mm.

45. The fabric or belt of claim 1, wherein the second layer has a caliper of 0.5 mm to 1.0 mm.

46. The fabric or belt of claim 1, wherein the second layer has a caliper of 0.5 mm to 0.75 mm.

47. The fabric or belt of claim 1, wherein the second layer is bonded to the first layer by thermal, ultrasonic, ultraviolet or infrared welding.

48. The fabric or belt of claim 1, wherein the second layer is bonded to the first layer with a 20% to 50% contact area.

49. The fabric or belt of claim 1, wherein the second layer is bonded to the first layer with a 20% to 30% contact area.

50. The fabric or belt of claim 1, wherein the second layer is bonded to the first layer with a 25% to 30% contact area.

51. The fabric or belt of claim 1, wherein the fabric or belt has an air permeability of 20 cfm to 300 cfm.

52. The fabric or belt of claim 1, wherein the fabric or belt has an air permeability of 100 cfm to 250 cfm.

53. The fabric or belt of claim 1, wherein the fabric or belt has an air permeability of 200 cfm to 250 cfm.

54. The fabric or belt of claim 1, wherein the papermaking machine is a Through Air Dried, Advanced Tissue Molding System (ATMOS), New Tissue Technology (NTT), Quality Rush Transfer (QRT) or Energy Efficient Technologically Advanced Drying (ETAD) tissue making machine.

55. The fabric or belt of claim 1, wherein the plurality of second elements extend below the plurality of first elements.

56. The fabric or belt of claim 55, wherein the plurality of second elements extend below the plurality of first elements by less than 0.40 mm.

57. The fabric or belt of claim 55, wherein the plurality of second elements extend below the plurality of first elements by 0.1 mm to 0.3 mm.

58. The fabric or belt of claim 55, wherein the plurality of second elements extend below the plurality of first elements by 0.1 mm to 0.2 mm.

59. The fabric or belt of claim 1, wherein the first direction is substantially parallel to a machine cross direction.

60. The fabric or belt of claim 59, wherein the second direction is substantially parallel to a machine direction.

61. The fabric or belt of claim 1, wherein the first direction is substantially parallel to a machine direction.

62. The fabric or belt of claim 61, wherein the second direction is substantially parallel to a machine cross direction.

\* \* \* \* \*